United States Patent
Song et al.

(10) Patent No.: US 9,402,151 B2
(45) Date of Patent: Jul. 26, 2016

(54) METHOD FOR RECOGNIZING POSITION OF MOBILE ROBOT BY USING FEATURES OF ARBITRARY SHAPES ON CEILING

(75) Inventors: Jae-Bok Song, Seoul (KR); Seo-Yeon Hwang, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 247 days.

(21) Appl. No.: 14/241,864

(22) PCT Filed: Aug. 27, 2012

(86) PCT No.: PCT/KR2012/006809
§ 371 (c)(1),
(2), (4) Date: Feb. 27, 2014

(87) PCT Pub. No.: WO2013/032192
PCT Pub. Date: Mar. 7, 2013

(65) Prior Publication Data
US 2014/0235267 A1    Aug. 21, 2014

(30) Foreign Application Priority Data
Aug. 27, 2011   (KR) .................. 10-2011-0086112

(51) Int. Cl.
*G06K 9/00* (2006.01)
*H04W 4/02* (2009.01)
(Continued)

(52) U.S. Cl.
CPC .............. *H04W 4/02* (2013.01); *G05D 1/0253* (2013.01); *G06T 7/0042* (2013.01);
(Continued)

(58) Field of Classification Search
None
See application file for complete search history.

(56) References Cited

U.S. PATENT DOCUMENTS 7,184,586 B2 * 2/2007 Jeon .......................... G01S 5/16
                                                                    382/153
8,548,194 B1 * 10/2013 Lyon ..................... G01C 5/005
                                                                    382/103
(Continued)

FOREIGN PATENT DOCUMENTS

JP   H03-92712 A    4/1991
JP   H10-109290 A   4/1998
(Continued)

OTHER PUBLICATIONS

Frintrop, Simone, and Patric Jensfelt. "Active gaze control for attentional visual SLAM." In Robotics and Automation, 2008. ICRA 2008. IEEE International Conference on, pp. 3690-3697. IEEE, 2008.*

(Continued)

*Primary Examiner* — Sumati Lefkowitz
*Assistant Examiner* — Carol Wang
(74) *Attorney, Agent, or Firm* — Rabin & Berdo, P.C.

(57) ABSTRACT

The present invention provides a method for recognizing a position of a mobile robot by using arbitrarily shaped ceiling features on a ceiling, comprising: a providing step of providing a mobile robot device for recognizing a position by using arbitrarily shaped ceiling features on a ceiling which includes an image input unit, an encoder sensing unit, a computation unit, a control unit, a storage unit, and a driving unit; a feature extraction step of extracting features which include an arbitrarily shaped ceiling feature from an outline extracted from image information inputted through the image input unit; and a localization step of recognizing a position of the mobile robot device by using the extracted features, wherein, in the feature extraction step, a descriptor indicating the characteristics of the arbitrarily shaped ceiling feature is assigned.

13 Claims, 34 Drawing Sheets

(51) Int. Cl.
*G05D 1/02* (2006.01)
*G06T 7/00* (2006.01)

(52) U.S. Cl.
CPC .... *G06T 7/0083* (2013.01); *G06T 2207/10016* (2013.01); *G06T 2207/10021* (2013.01); *G06T 2207/20076* (2013.01); *G06T 2207/30244* (2013.01); *G06T 2207/30252* (2013.01)

(56) References Cited

U.S. PATENT DOCUMENTS

| | | | | |
|---|---|---|---|---|
| 2002/0181754 | A1* | 12/2002 | Masumoto | G06T 7/0081 382/131 |
| 2006/0165276 | A1* | 7/2006 | Hong | G05D 1/0253 382/153 |
| 2006/0233423 | A1* | 10/2006 | Najafi | G06K 9/3208 382/103 |
| 2007/0183661 | A1* | 8/2007 | El-Maleh | G06K 9/00234 382/173 |
| 2008/0187220 | A1* | 8/2008 | Doretto | G06K 9/4647 382/173 |
| 2009/0028387 | A1* | 1/2009 | Jeong | G06K 9/00664 382/103 |
| 2009/0055020 | A1* | 2/2009 | Jeong | G05D 1/0246 700/251 |
| 2010/0070125 | A1* | 3/2010 | Lee | G06T 7/0042 701/28 |
| 2010/0094460 | A1* | 4/2010 | Choi | B25J 9/1692 700/251 |
| 2010/0104184 | A1* | 4/2010 | Bronstein | G06F 17/30784 382/170 |
| 2010/0174409 | A1* | 7/2010 | Park | G05D 1/0246 700/259 |
| 2011/0038540 | A1* | 2/2011 | Ahn | G06K 9/4671 382/173 |
| 2011/0044504 | A1* | 2/2011 | Oi | G06T 7/0042 382/103 |
| 2012/0213443 | A1* | 8/2012 | Shin | G05D 1/0246 382/190 |
| 2013/0116826 | A1* | 5/2013 | Kim | G05D 1/0246 700/259 |

FOREIGN PATENT DOCUMENTS

| | | |
|---|---|---|
| JP | 2004-012429 A | 1/2004 |
| JP | 2004-301796 A | 10/2004 |
| JP | 2007-078476 A | 3/2007 |
| KR | 10-0586648 B1 | 6/2006 |
| KR | 10-2006-0074044 A | 7/2006 |
| KR | 10-0791384 B1 | 1/2008 |
| KR | 10-0834761 B1 | 6/2008 |
| KR | 10-0835906 B1 | 6/2008 |
| KR | 10-0871115 B1 | 11/2008 |
| KR | 10-0926601 B1 | 11/2009 |
| KR | 10-2010-0031277 A | 3/2010 |
| KR | 10-2011-0009547 A | 1/2011 |
| KR | 10-1036028 B1 | 5/2011 |

OTHER PUBLICATIONS

Hwang, Seo-Yeon, Joong-Tae Park, and Jae-Bok Song. "Autonomous navigation of a mobile robot using an upward-looking camera and sonar sensors." In Advanced Robotics and its Social Impacts (ARSO), 2010 IEEE Workshop on, pp. 40-45. IEEE, 2010.*

* cited by examiner

METHOD FOR RECOGNIZING POSITION OF MOBILE ROBOT BY USING FEATURES OF ARBITRARY SHAPES ON CEILING

TECHNICAL FIELD

The present invention relates to a robot device and a control method thereof, and more particularly, to a mobile robot localization method using arbitrarily shaped (AS) features of a ceiling, in which directionality of the arbitrarily shaped ceiling features is taken into consideration to enable more accurate localization of the robot, and a mobile robot device which is localized using the arbitrarily shaped ceiling features by the method.

BACKGROUND ART

Demands on robots for household purposes as well as industrial purposes, are increasing, and studies on the robots are actively in progress accordingly. Particularly, unlike conventional robots held in the stationary position, studies on a movable mobile robot are actively in progress. Studies are in progress on a technique of correctly estimating its own location of the movable mobile robot using a surrounding environment and a mapping technique of allowing the movable mobile robot to grasp its own location using a reference landmark as a starting point to correctly estimate its own location of the movable mobile robot.

Particularly, information containing a specific shape such as a vertex or a straight line among information acquired from the surrounding environment is named as a feature, and a map created using the feature is referred to as a feature map. Since the feature is used as a landmark for localizing a robot in an environment, information such as which of features will be extracted and used, whether or not the extracted feature has a robust characteristic according to a change in the surrounding environment and the like becomes an important factor in creating an accurate feature map.

In general, a low-priced small robot employs an infrared sensor or a ultrasonic sensor as a sensor for detecting a state for navigation. The infrared sensor makes it difficult to achieve more accurate mapping due to information leakage caused by linearity and severe noises. In addition, the ultrasonic sensor has an advantage of having a wide sensing range, but still entails a problem in that it is difficult to achieve more accurate mapping due to severe noises.

A ceiling image-based robot including a ceiling-oriented single camera which can utilize a ceiling image has been developed in order to overcome these problems. Such a ceiling-oriented single camera-equipped robot has an advantage in that it may exclude an interference caused by a dynamic object such as a person or an obstacle and stably trace a landmark. However, the conventional ceiling-oriented single camera-equipped robot according to the prior art uses a corner feature and a straight line feature as features. The corner feature may be stably matched, but has a drawback in that information is severely changed by a change in brightness according to the change of illumination or the like. In addition, the straight line feature has a shortcoming in that it makes it difficult to determine whether or not the straight line feature is correctly matched due to confusion when a plurality of straight line features is provided.

In Korean Patent Registration No. 10-0871115, various studies are conducted on localization of a mobile robot, such as selecting a method for reducing a load and increasing accuracy through a technique of extracting and removing unnecessary feature points among image data for recognizing a ceiling image.

In addition, in case of the ceiling image, rapid localization is difficult due to a computation load of image features, and there is a difficulty in that rapid localization should be enabled and simultaneously robustness of the features of the ceiling should be secured to perform an accurate localization.

In addition, since a conventional method of recognizing an image of a ceiling is performed in a simplest and formalized environment, i.e., focusing on formalized features such as an illumination feature, a straight line feature and a corner feature, it is quite difficult to secure generality in a new environment.

DISCLOSURE OF INVENTION

Technical Problem

The present invention has been made to solve the above problems associated with the prior art, and it is an object of the present invention to provide a method for localizing a mobile robot using arbitrarily shaped ceiling features, in which the characteristics of the arbitrarily shaped ceiling features is taken into consideration to enable more accurate localization of the robot while performing rapid localizationion using a ceiling image, and a mobile robot device which is localized by the method using the arbitrarily shaped ceiling features.

Technical Solution

To achieve the above objects, in one aspect, the present invention provides a method for localizing a mobile robot using arbitrarily shaped ceiling features, comprising: a device providing step of providing a mobile robot device which is localized using the arbitrarily shaped ceiling features and includes an image input unit, an encoder sensing unit, an arithmetic unit, a control unit, a storage unit, and a driving unit; a feature extraction step of extracting features which include an arbitrarily shaped feature from a contour extracted from image information inputted through the image input unit; and a localization step of localizing the mobile robot device using the extracted features, wherein a descriptor indicating the characteristics of the arbitrarily shaped feature is assigned in the feature extraction step.

In the mobile robot localization method using arbitrarily shaped ceiling features, the feature extraction step may include: a region-of-interest (ROI) extraction step of detecting and labeling the contour from the image information, and extracting a region of interest (ROI); an ROI descriptor creation step of assigning a descriptor indicating the characteristics of the region of interest to the region of interest; and an ROI robustness confirmation step of confirming whether or not the region of interest is set as a feature used in the localization step based on the descriptor of the region of interest and a preset reference stored in the storage unit.

In the mobile robot localization method using arbitrarily shaped ceiling features, the region-of-interest extraction (ROI) step may include: an image binary coding step of binary-coding the image information; a contour detection step of detecting the contour from the binary-coded image information; a labeling step of grouping regions connected by the contour detected in the contour detection step; and an ROI setting step of setting the regions grouped in the labeling step as a region of interest.

In the mobile robot localization method using arbitrarily shaped ceiling features, the labeling step may use a dilation operation, and a circular window having a predetermined radius is used in the dilation operation.

In the mobile robot localization method using arbitrarily shaped ceiling features, the ROI descriptor creation step may include: an ROI node distribution confirmation step of setting the outer corners of the region of interest as nodes of the region of interest, and confirming coordinates of the nodes of the region of interest from the outer corners of the region of interest; an ROI size confirmation step of confirming a size of the region of interest; and an ROI orientation confirmation step of confirming an orientation of region of interest.

In the mobile robot localization method using arbitrarily shaped ceiling features, the coordinates of the nodes of the region of interest may be polar coordinates.

In the mobile robot localization method using arbitrarily shaped ceiling features, the coordinates of the nodes of the region of interest may be Cartesian coordinates.

In the mobile robot localization method using arbitrarily shaped ceiling features, the ROI robustness confirmation step may include: an ROI similarity calculation step of calculating a similarity defining a resemblance between regions of interest in the current image; an ROI uniqueness calculation step of calculating a region-of-interest (ROI) uniqueness by assigning a weighting factor to a similarity between other regions of interest adjacent to the region of interest in the current image; a uniqueness determination step of comparing the calculated ROI uniqueness with a preset uniqueness stored in the storage unit, and determining whether or not the calculated ROI uniqueness has stability as a feature; and an ROI robustness determination step of confirming whether or not the ROI uniqueness is used as a feature of the region of interest depending on a result of determination in the uniqueness determination step.

In the mobile robot localization method using arbitrarily shaped ceiling features, the ROI similarity calculation step may include: an ROI confirmation step of confirming the regions of interest in the current image; an ROI setting step of setting a target region of interest and a comparison region of interest from the confirmed regions of interest; an node distribution similarity calculation step of calculating a similarity in node distribution between the target region of interest and the comparison region of interest; a size similarity calculation step of calculating a similarity in size between the target region of interest and the comparison region of interest; an orientation similarity calculation step of calculating a similarity in orientation between the target region of interest and the comparison region of interest; an ROI similarity calculation step of finally calculating a region-of-interest (ROI) similarity S from the node distribution similarity, the size similarity, and the orientation similarity; a remaining comparison ROI determination step of determining whether or not there exists a remaining comparison region of interest which is not compared with the target region of interest among the regions of interest in the current image; and a remaining ROI determination step of determining whether or not there exists a remaining region of interest which is not set as the target region of interest among the regions of interest in the current image if it is determined in the remaining comparison ROI determination step that there does not exist the remaining comparison region of interest.

In the mobile robot localization method using arbitrarily shaped ceiling features, the node distribution similarity calculation step may include: a node distance calculation step of calculating a distance between the nodes the target region of interest and the comparison region of interest; a node pair comparison and confirmation step of comparing the node distance with a preset similar range distance stored in the storage unit 400, confirming the number N of node pairs having the node distance d smaller than the similar range distance, and storing coordinate information of the node pairs; a target ROI rotation step of rotating the target region of interest about a center point of the target region of interest by a preset angle; a target ROI rotation completion determination step of confirming whether or not the rotation angle of the target region of interest reaches 360°; a node distribution similarity operation step of operating the similarity in node distribution between the target region of interest and the comparison region of interest using the minimum node distance and the number of node pairs if it is determined that the rotation angle of the target region of interest reaches 360° in the ROI rotation completion determination step.

In the mobile robot localization method using arbitrarily shaped ceiling features, the localization step may include: a prediction step of creating a predicted position of the mobile robot device at the current stage and a predicted image of an arbitrarily shaped feature at the predicted position, based on an estimated position of the mobile robot device using arbitrarily shaped ceiling features and an estimated image of the arbitrarily shaped ceiling feature at the previous stage, which are calculated based on image information obtained from the image input unit, and a signal of the encoder sensing unit; a feature matching step of confirming whether or not there is a match between the arbitrarily shaped feature extracted in the feature extraction step and the arbitrarily shaped feature in the predicted image, and creating match information; and an estimation step of correcting the predicted position of the mobile robot device and a predicted value of the arbitrarily shaped feature depending on the match information created in the feature matching step.

In the mobile robot localization method using arbitrarily shaped ceiling features, if it is determined that the arbitrarily shaped feature in the predicted image in the feature matching step does not match the arbitrarily shaped feature extracted from the image information obtained from the image input unit, the arbitrarily shaped feature in the image information obtained from the image input unit may be set and stored as a new feature.

In the mobile robot localization method using arbitrarily shaped ceiling features, the feature matching step may include: a predicted image feature extraction step of extracting the arbitrarily shaped feature in the predicted image; a predicted image feature descriptor creation step of assigning a descriptor indicating the characteristics of the arbitrarily shaped feature to the arbitrarily shaped feature in the predicted image; and a predicted image feature matching step of comparing the arbitrarily shaped feature in the image information, which is extracted in the feature extraction step with the arbitrarily shaped feature in the predicted image.

In the mobile robot localization method using arbitrarily shaped ceiling features, the predicted image feature matching step may include: a predicted intersection number confirmation step of confirming whether or not the predicted number of intersections in which the extracted arbitrarily shaped feature in the image information intersects a region of uncertainty of the arbitrarily shaped feature in the predicted image; a predicted intersection number determination step of determining whether or not the predicted number of intersections in the predicted intersection number confirmation step is 1; a predicted feature similarity calculation step of calculating a similarity in predicted feature defining a resemblance between the arbitrarily shaped feature in the image information and the arbitrarily shaped feature in the predicted image if it is determined that the predicted number of intersections in the predicted intersection number confirmation step is 1; a feature similarity comparison step of comparing the similarity in predicted feature with a preset similarity in feature stored in the storage unit; and a feature similarity confirmation step of confirming whether or not there is a match between the arbitrarily shaped feature in the image information and the arbitrarily shaped feature in the predicted image depending on a result of comparison in the feature similarity comparison step.

In the mobile robot localization method using arbitrarily shaped ceiling features, if it is determined in the predicted intersection number determination step that the predicted number of intersections is zero, the control flow proceeds to a position restoration step, wherein the position restoration step may include: a position restoration feature matching step of comparing all the descriptors between an arbitrarily shaped feature in current mage information and features stored in the storage unit, confirming whether or not there is another matched feature stored in the storage unit, and assigning a candidate position of the mobile robot device to the circumference of the other matched feature; a mobile robot device orientation confirmation step of confirming an orientation of the mobile robot device using two-dimensional coordinates of the other matched feature on a global coordinate system, the position of the mobile robot device on the candidate position, and an angle formed between a reference coordinate axis in the image information and the other matched feature; and a priority candidate position selection step of assigning a priority to the candidate position based on the position information and orientation information on the other matched feature, and the orientation information of the mobile robot device.

Advantageous Effects

A mobile robot localization method using arbitrarily shaped ceiling features and a mobile robot device which is localized by the method using the arbitrarily shaped ceiling features according to the present invention having the configuration described above have the following effects.

First, the mobile robot localization method using arbitrarily shaped ceiling features and the mobile robot device which is localized by the method using the arbitrarily shaped ceiling features according to the present invention use a variety of arbitrary shapes of an atypical form such as a ventilator, a fire alarm, a speaker and the like, in addition to a corner, a straight line, an illumination and the like, which has a predetermined form to be arranged on a ceiling, in order to perform localization of the mobile robot, so that generalization of a use environment can be secured by enhancing utilization of ceiling recognition.

Second, the mobile robot localization method using arbitrarily shaped ceiling features and the mobile robot device which is localized by the method using the arbitrarily shaped ceiling features according to the present invention provide a basis for determining correct matching in a process such as matching or the like by assigning a descriptor of an arbitrarily shaped feature, secure robustness of the feature of an illumination or the like which is sensitive to changes in an environment, and perform a rapid computation by assigning a descriptor which allows the computation to be performed further efficiently, so that superior localization performance can be ensured.

Third, the mobile robot localization method using arbitrarily shaped ceiling features and the mobile robot device which is localized by the method using the arbitrarily shaped ceiling features according to the present invention reduce a computation load through the descriptor of the arbitrarily shaped feature to reduce the cost of the arithmetic unit, so that an excellent manufacturing cost reducing effect can be obtained.

Fourth, the mobile robot localization method using arbitrarily shaped ceiling features and a mobile robot device which is localized by the method using the arbitrarily shaped ceiling features according to the present invention enables localization of the mobile robot through more correct feature recognition even using a single camera, so that manufacturing cost of the device can be remarkably saved, and the operation and maintenance cost can be reduced, thereby maximizing the cost saving.

Fifth, since the mobile robot localization method using arbitrarily shaped ceiling features and the mobile robot device which is localized by the method using the arbitrarily shaped ceiling features according to the present invention can perform a rapid position restoration function when localization is failed due to a change in the position of the mobile robot device caused by either an external force or the sliding of the mobile robot device.

Sixth, the mobile robot localization method using arbitrarily shaped ceiling features and a mobile robot device which is localized by the method using the arbitrarily shaped ceiling features according to the present invention adopt a method of minimizing candidate positions of the mobile robot device and assigning priorities to the candidate positions in performing the position restoration function, so that the computation load can be reduced, and thus a rapid and robust position restoration function can be accomplished.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Figure 1:
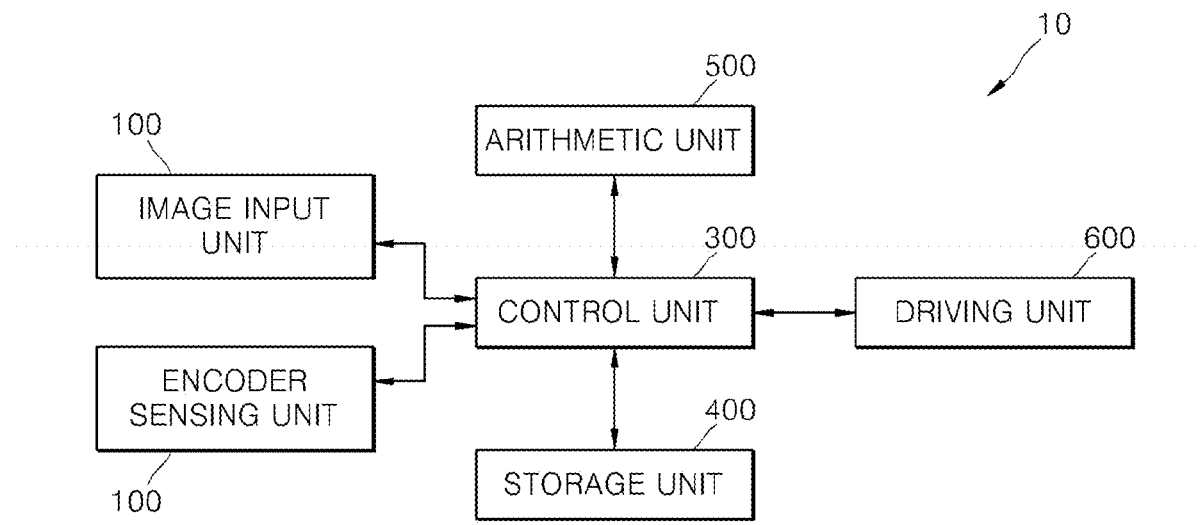
FIG. 1 is a block diagram schematically showing a mobile robot device which is localized using arbitrarily shaped ceiling features according to an embodiment of the present invention.

Hereinafter, a mobile robot device which is localized using arbitrarily shaped ceiling features and a method for localizing the mobile robot device will be described with reference to the accompanying drawings.

A mobile robot device 10 which is localized using arbitrarily shaped ceiling features according to an embodiment of the present invention includes an image input unit 100, an encoder sensing unit 200, a control unit 300, a storage unit 400, an arithmetic unit 500 and a driving unit 600. Such a mobile robot device which is localized using arbitrarily shaped ceiling features is provided, and a predetermined control process is performed. The control unit 300 may electrically communicate with other constituent elements to receive an input signal and apply a control signal to each of the constituent elements. The image input unit 100 may be configured in a variety of ways. Although the image input unit 100 is configured as a monocular camera in this embodiment, it may be implemented as a stereo camera. When the image input unit 100 is implemented as a monocular camera, it is not easy to accurately recognize a distance to a target in a ceiling image obtained through the monocular camera due to the image input unit 100 which is implemented as the monocular camera. The arithmetic unit 500 performs a predetermined operational process in response to the control signal of the control unit 300, and the storage unit 400 stores a variety of preset values in advance and stores needed image information or position information in response to the control signal of the control unit 300. The driving unit 600 is implemented as an electric motor or the like. The driving unit 600 is driven in response to the control signal of the control unit 300, and provides a driving force for moving the mobile robot device 10 which is localized using arbitrarily shaped ceiling features to a desired position. The encoder sensing unit 200 detects the number of rotations and a rotation angle of driving wheels (not shown) driven by the driving unit 300. The rotation angle may be calculated and derived according to a difference in the number of rotations of each driving wheel.

Figure 2:
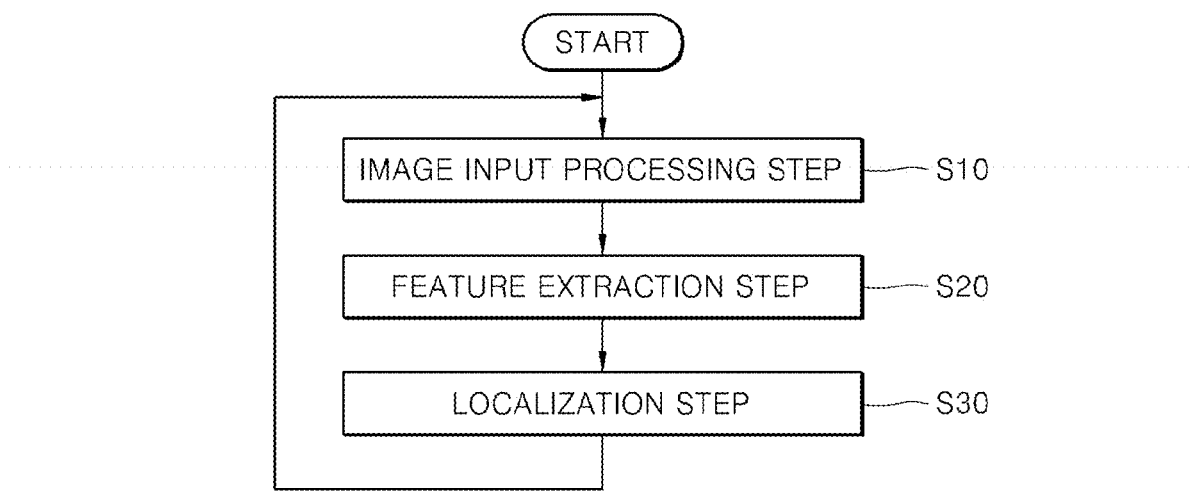
FIG. 2 is a control flowchart schematically illustrating a mobile robot localization method using arbitrarily shaped ceiling features according to an embodiment of the present invention.

FIG. 2 is a flowchart schematically showing a control process of a mobile robot device 10 which is localized using arbitrarily shaped ceiling features according to an embodiment of the present invention. When correction of an image is needed such as in the case where a monocular camera is used as the image input device 100, a certain image input processing step S10 may be further performed. The control unit 300 receives a ceiling image (or image information) from the image input unit 100 and processes the image information (S10). The mobile robot device 10 which is localized using arbitrarily shaped ceiling features as described above is provided before performing the image input processing step S10, and description of such provision of the mobile robot device 100 is omitted in the flowchart of FIG. 2.

Figure 3:
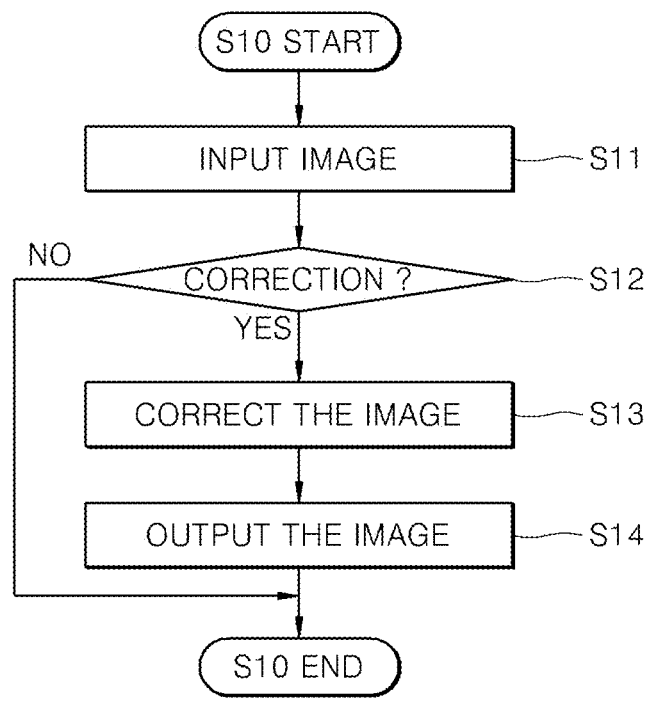
FIG. 3 is a flowchart illustrating an image input processing step of a mobile robot localization method using arbitrarily shaped ceiling features according to an embodiment of the present invention.

FIG. 3 shows an example of a more specific flow of the image input processing step S10. The control unit 300 applies a control signal to the image input unit 100 so that the image input unit 100 implemented as a monocular camera may acquire image information on the ceiling at the current position of the mobile robot device 10 which is localized using arbitrarily shaped ceiling features and input the acquired image information into the control unit 300 (S11). The control unit 300 determines whether the input image or the image information is distorted (S12). If the input image or the image information is distorted, the control unit 300 transfers the input image or the image information to the arithmetic unit 500 to perform an image correction step of performing a correction of an image (S13).

Figure 4:
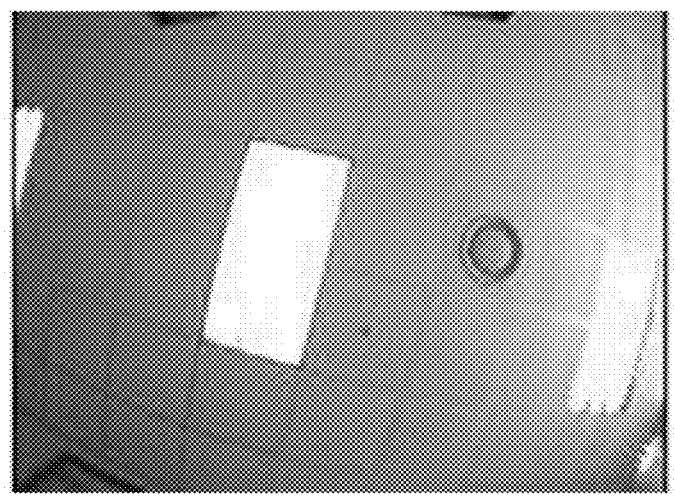
FIGS. 4 and 5 are diagrams schematically showing an image obtained from an image input unit of a mobile robot device which is localized using arbitrarily shaped ceiling features according to an embodiment of the present invention and an image obtained by correcting a distortion of the obtained image.
Figure 5:
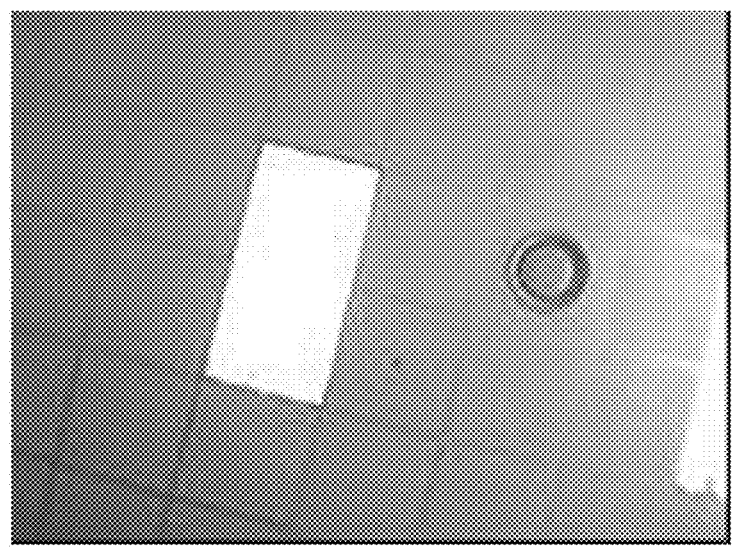

FIGS. 4 and 5 schematically show examples of an image before and after image correction. The image input unit 100 implemented as a monocular camera extracts features of the ceiling image, and a distortion occurs in the image information acquired in order to secure a wide view to obtain an image or image information for continuously tracing the features. The arithmetic unit 500 corrects the distortion phenomenon by processing the image or the image information inputted thereto from the image input unit 100 in response to the control signal of the control unit 300. If the image correction is completed or it is determined that the image correction is not needed, the control unit 300 outputs the corrected image or image information to the storage unit 300 (S14).

Then, the control unit 300 performs the feature extraction step S20, and the control unit 300 extracts features including an arbitrarily shaped feature existing in the current image based on the image in which image distortion or the like is corrected. The arbitrarily shaped features are included in the features obtained in the feature extraction step performed in the mobile robot localization method using arbitrarily shaped ceiling features according to an embodiment of the present invention.

Figure 6:
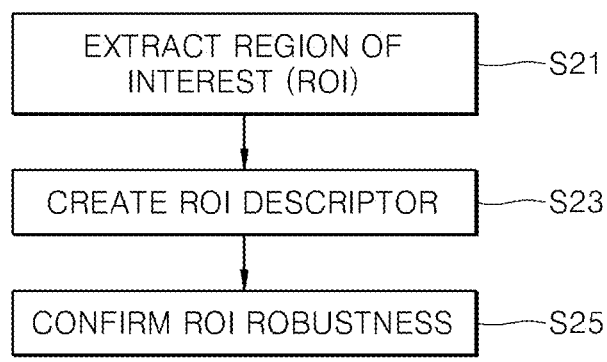
FIG. 6 is a flowchart schematically illustrating a feature extraction step of a mobile robot localization method using arbitrarily shaped ceiling features according to an embodiment of the present invention.

FIG. 6 shows an example of the feature extraction step according to an embodiment of the present invention. Although the feature extraction step S20 in this embodiment mainly uses the arbitrarily shaped feature obtained from the contour, various modifications may be made, including the use other features such as a corner feature, an illumination feature, or the like. In this embodiment, the feature extraction step will be described centering on the arbitrarily shaped feature extracted using the contour.

The feature extraction step S20 according to this embodiment includes a region-of-interest (ROI) extraction step S21, an ROI descriptor creation step S23, and an ROI robustness confirmation step S25. Here, a region of interest (ROI) refers to a predetermined region in the image information divided through a labeling process of grouping contour information extracted from the image information. Through a predetermined step of confirming or determining the region of interest, which will be described later, it is determined whether or not the region of interest is used as a feature on a feature map which will be used in a localization step S30.

Figure 7:
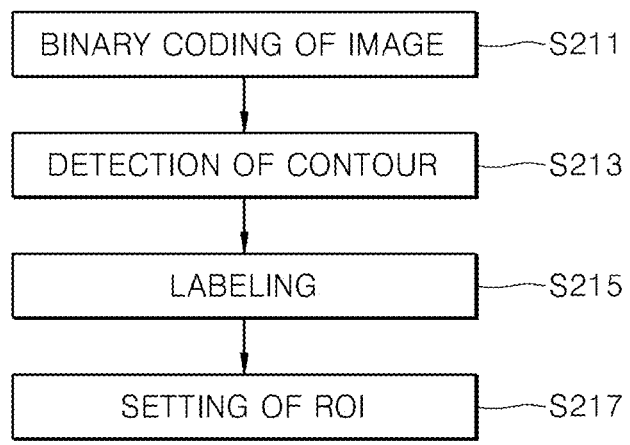
FIG. 7 is a flowchart schematically illustrating a region-of-interest (ROI) extraction step included in the feature extraction step of a mobile robot localization method using arbitrarily shaped ceiling features according to an embodiment of the present invention.

The control unit 300 extracts the region of interest (ROI) by detecting and labeling a contour from the image information input and processed through the image input unit 100 in the ROI extraction step S21. FIG. 7 shows substeps of the ROI extraction step S21. In FIG. 7, the ROI extraction step S21 includes an image binary coding step S211, a contour detection step S213, a labeling step S215 and an ROI setting step S217. The control unit 300 performs a binary coding on the current image information in the image binary coding step S211.

Figure 8:
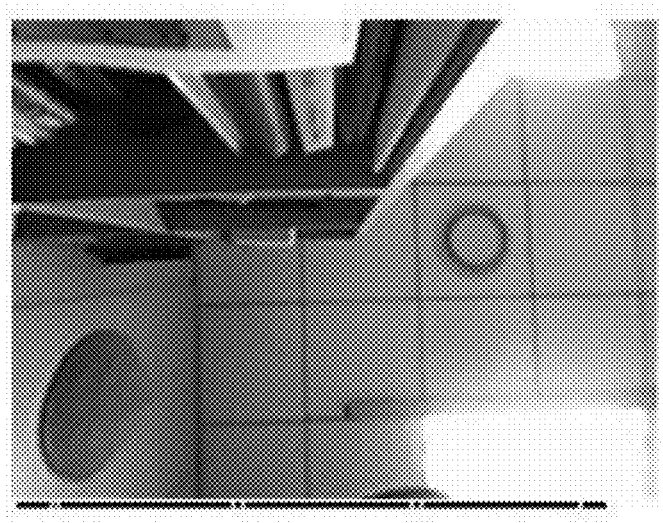
FIGS. 8 to 15 are diagrams showing a process of the ROI extraction step of a mobile robot localization method using arbitrarily shaped ceiling features according to an embodiment of the present invention and state diagrams showing a relationship between a window and binary-coded image information used in the present invention.

Then, the control unit 300 detects a contour from the binary-coded image information binary-coded by performing the contour detection step S213. A variety of methods may be used to detect the contour. Various edge detection methods such as Sobell, Prewitt and the like are used in the image processing field. Although a Canny edge detector which detects an edge from image information and has an object (i.e., the region of interest in this embodiment) is used in this embodiment, various modifications may be made depending on design specifications. FIG. 8 shows image information, and FIG. 9 shows a contour-extracted, binary-coded image in which a contour is extracted from the binary-coded image information.

Thereafter, the control unit 300 groups the regions connected by a predetermined contour by performing the labeling step S215. The labeling step S215 is a process of making a group of regions connected by the contour. Although a variety of methods can be used for the labeling, a Grassfire algorithm is used in this embodiment.

Figure 9:
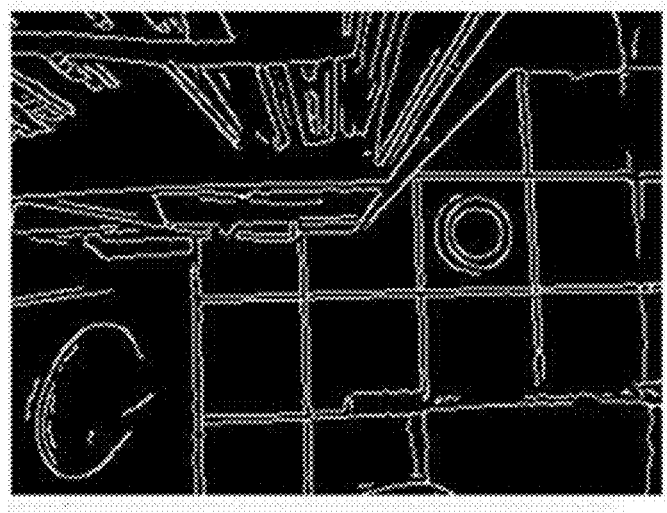
Figure 10:
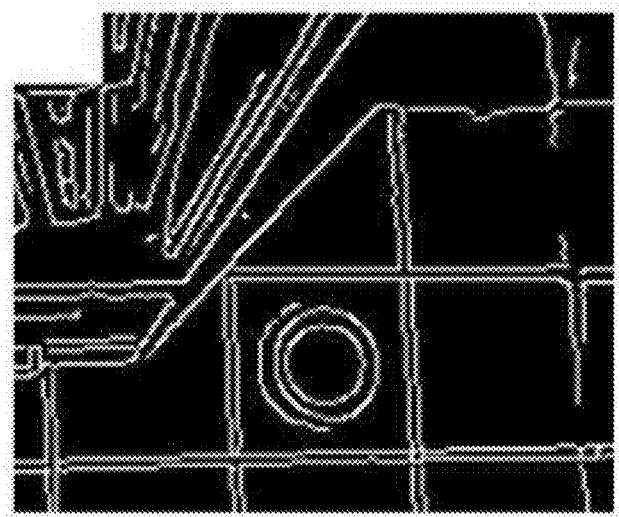
Figure 11:
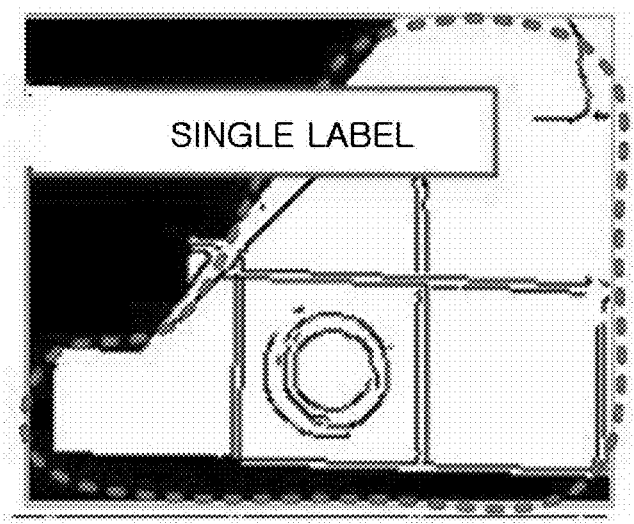
Figure 15:
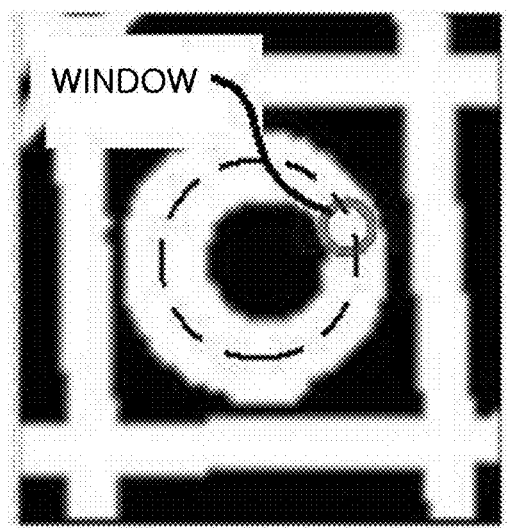

The white parts in FIG. 9 indicate contours, and the black region should also be taken into consideration to extract a region in which a feature is likely to exist like an object, i.e., a region of interest. When such a labeling process is performed in the black region, there is a problem in that the black region is grouped together with other adjacent regions. FIGS. 10 and 11 show a contour-extracted, binary-coded image and a labeled binary-coded image which is obtained when simple grouping is performed in the black region from the contour-extracted, binary-coded image. As shown in FIG. 11, regions to be grouped into a plurality of groups are grouped as a single region. In order to solve such a problem, a dilation operation is performed in the labeling step of grouping the regions in this embodiment, and a circular window having a predetermined radius is used as a window used in the dilation operation (see FIG. 15 wherein a dotted line virtually indicates a path of the window moving along the contour). Since the dilation operation is performed using such a circular window, regions separated or grouped through the dilation operation can be made clearer, and loss of image information due to unnecessary dilation can be minimized. That is, when a conventional quadrangular shaped window is used, there is a high possibility that regions which is to be separated will be unwillingly grouped as one region is increased in some cases since a distance from the center to the outer edge of the window varies depending on the outer edge of a corresponding window. In this embodiment, the distance from the center to the outer edge of the window is uniformly maintained by using a circular window, so that unnecessary loss of the image information can be prevented and clear separation of the finally grouped regions can be accomplished.

Figure 12:
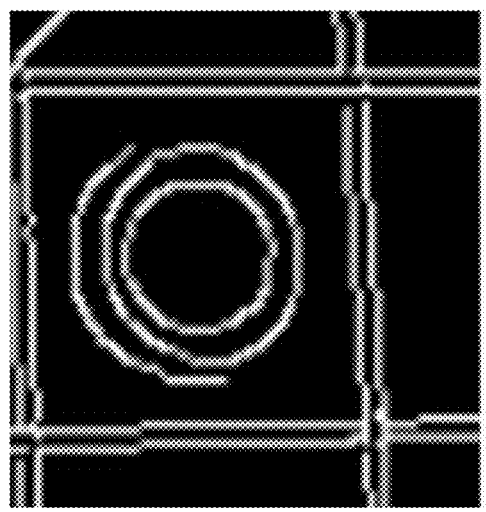
Figure 13:
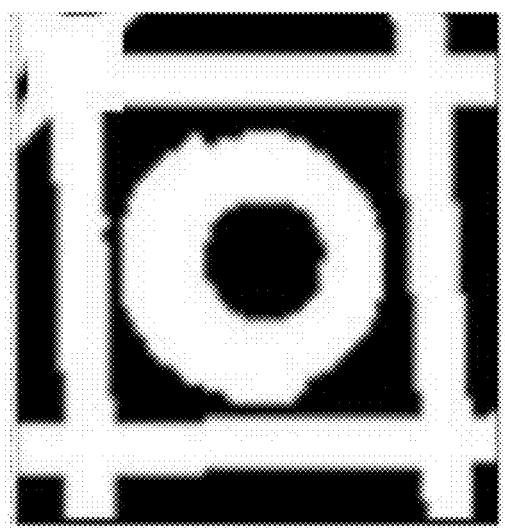
Figure 14:
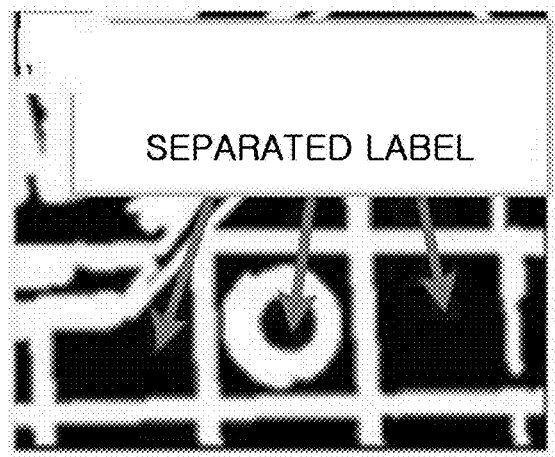

FIGS. 12 to 14 show a result of performing a labeling step in which a dilation operation using such a circular window is accomplished. As shown in FIG. 12, when the dilation operation is performed on the counter using a circular window having a predetermined radius, a result of the dilation operation as shown in FIG. 13 can be obtained. FIG. 14 shows image information which is shown together with a dilated adjacent region of the circular window, and grouped separate regions which can be demarcated as regions of interest through the clearly dilated contours can be confirmed.

Then, the control unit 300 performs the ROI setting step S217 of setting the grouped separate regions obtained at the step S215 as regions of interest.

Figure 16:
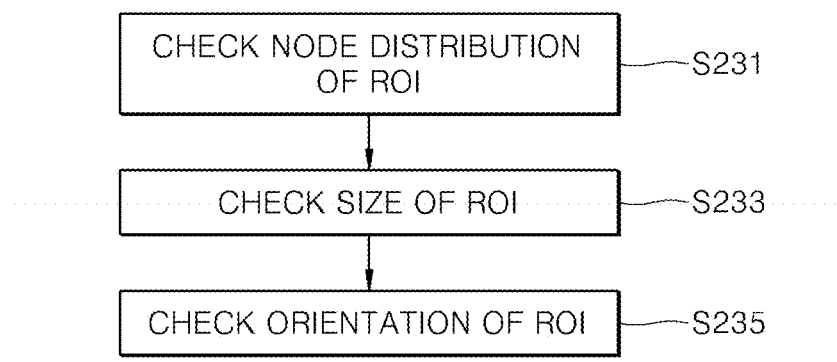
FIG. 16 is a flowchart a specific process of an ROI descriptor creation step of a mobile robot localization method using arbitrarily shaped ceiling features according to an embodiment of the present invention.

After the regions of interest are extracted and set, the control unit 300 performs the ROI descriptor creation step S23 of assigning a descriptor to a region of interest (ROI) (see FIG. 16). Here, the descriptor is assigned to distinguish a region of interest (ROI) and represents the characteristics of the region of interest. The descriptor of the present invention includes node distribution, size, and orientation of the region of interest.

Figure 17:
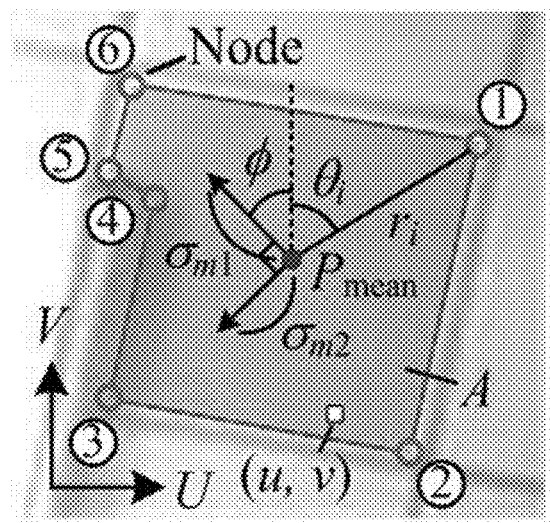
FIGS. 17 and 18 are a state diagram and a graph showing a process of an ROI node distribution confirmation step of a mobile robot localization method using arbitrarily shaped ceiling features according to an embodiment of the present invention.

In the ROI descriptor creation step S23, the control unit 300 performs an ROI node distribution confirmation step S231, an ROI size confirmation step S233, and an ROI orientation confirmation step S235. In the ROI node distribution confirmation step S231, the control unit 300 sets outer corners of a region of interest as nodes of the region of interest, i.e., ROI nodes (①②③④⑤⑥, see FIG. 17) and confirms polar coordinates (r,θ) as coordinates of the nodes (①②③④⑤⑥) of the region of interest from the center ($P_{mean}$) of the region of interest. FIG. 17 schematically shows a region of interest in image information wherein U-V denotes a coordinate axis in the image information, $P_{mean}$ denotes a center point of a target region of interest, and ri and θi are polar coordinates from the center of the region of interest and respectively denote a distance and an angle between the center point of the region of interest and each node of the region of interest.

Figure 18:
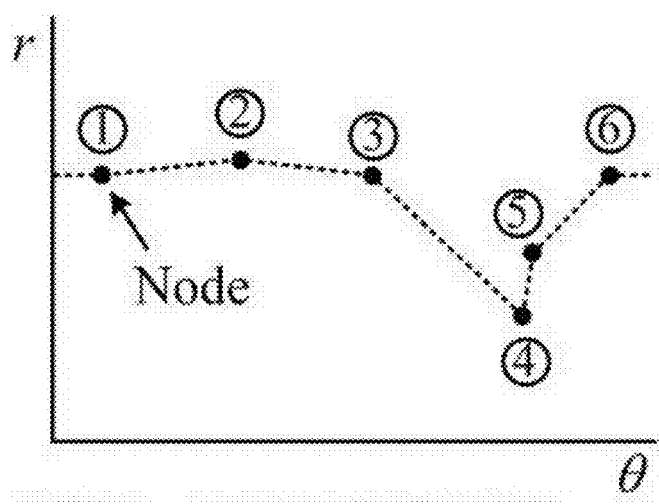

When distribution of nodes in the region of interest, i.e., node distribution in the region of interest, is expressed as a diagram, it may be expressed as an r-θ diagram as shown in FIG. 18.

Figure 21:
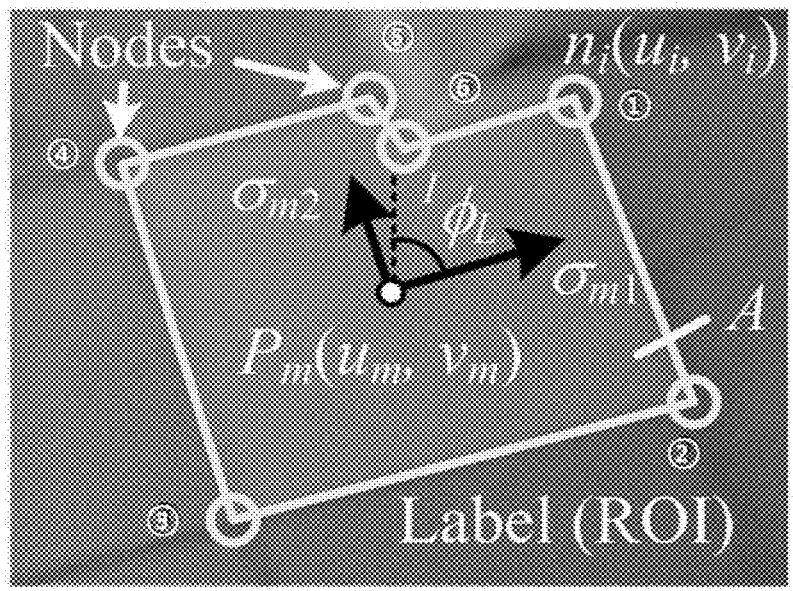
FIGS. 21 and 22 are a state diagram and a diagrammatic view showing a process of another example of an ROI node distribution confirmation step of a mobile robot localization method using arbitrarily shaped ceiling features according to an embodiment of the present invention.
Figure 22:
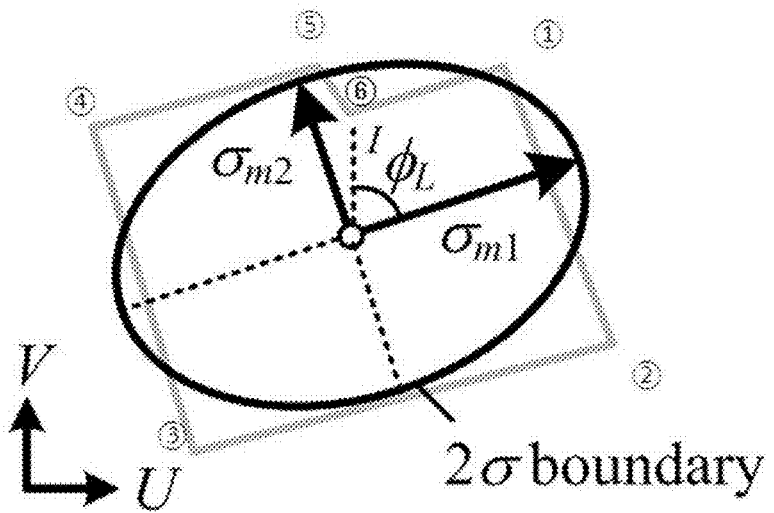
Figure 23:
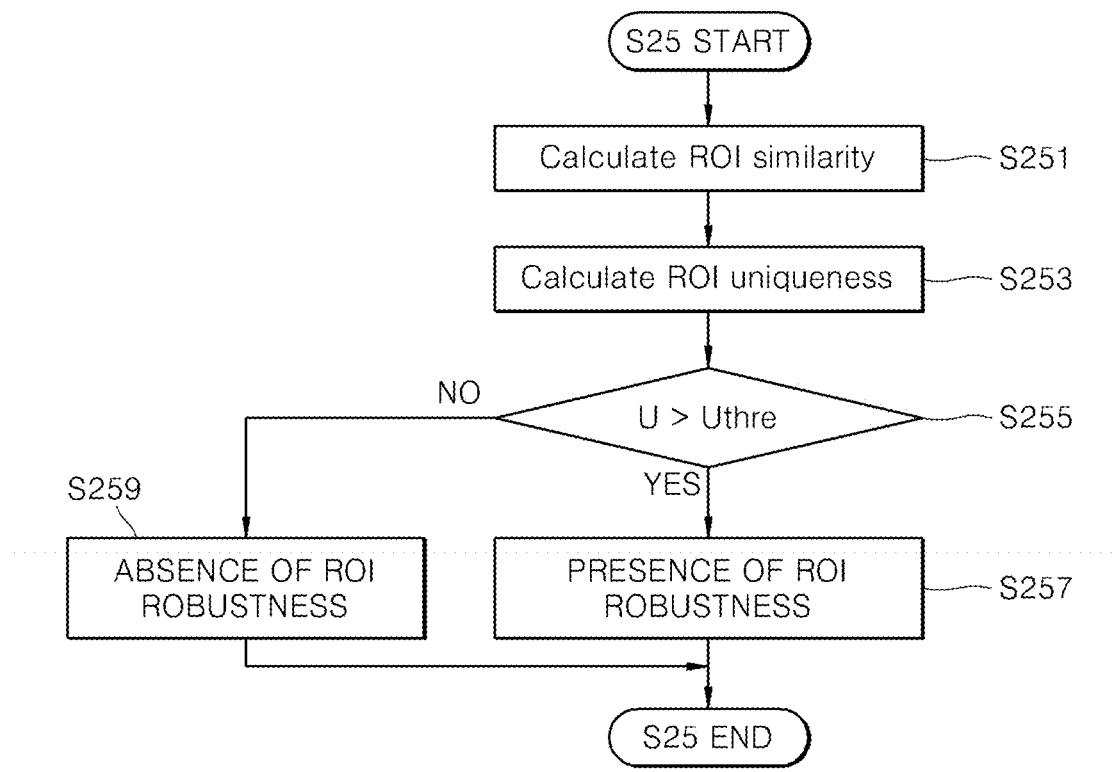
FIG. 23 is a flowchart showing an ROI robustness confirmation step of a mobile robot localization method using arbitrarily shaped ceiling features according to an embodiment of the present invention.
Figure 24:
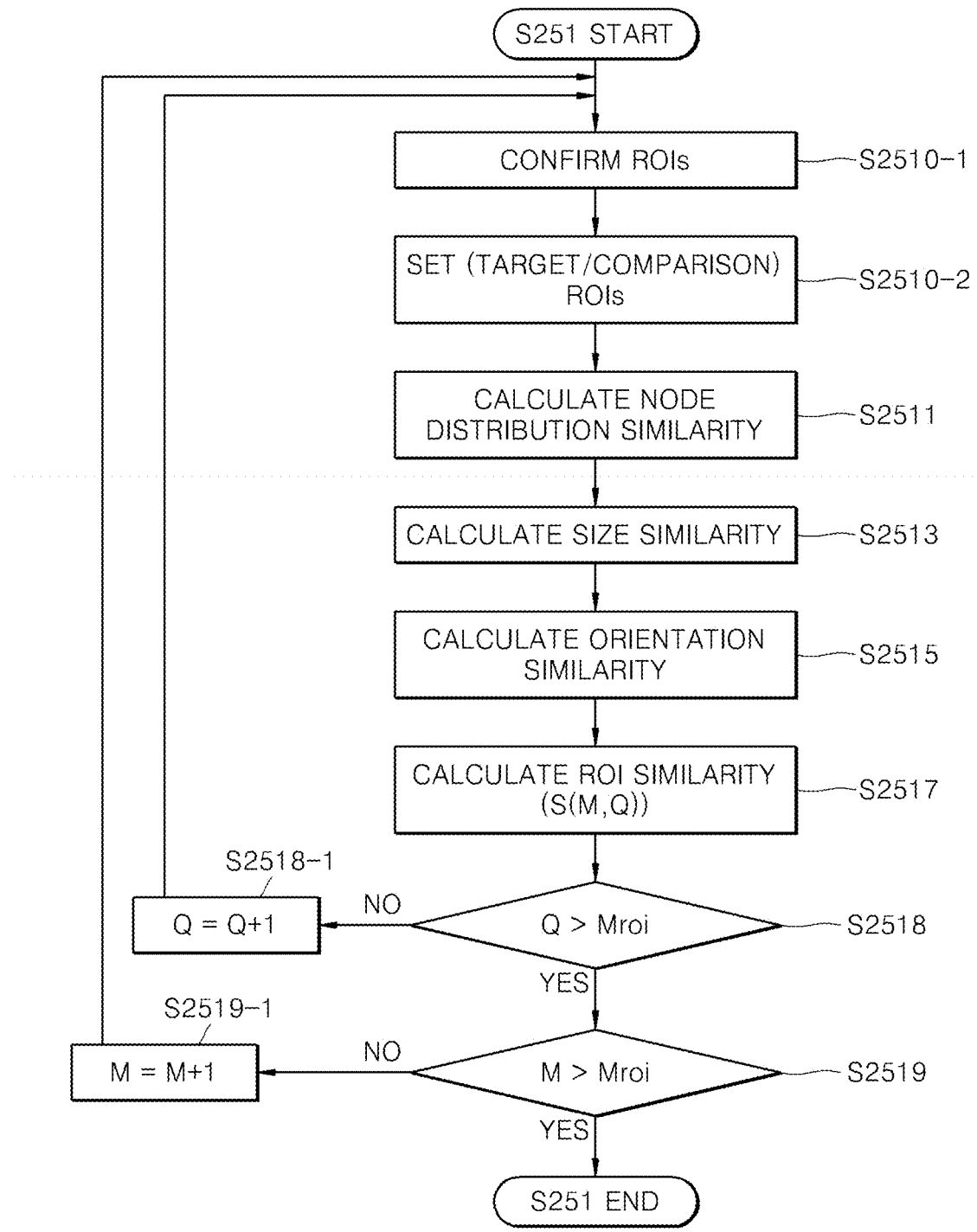
FIG. 24 is a flowchart showing an ROI similarity calculation step of a mobile robot localization method using arbitrarily shaped ceiling features according to an embodiment of the present invention.

Meanwhile, although it has been described in the above embodiment that polar coordinates are the coordinates of nodes of a region of interest, in creating node distribution of a region of interest as a descriptor of the region of interest, the node distribution of a region of interest may be expressed using Cartesian coordinates on the Cartesian coordinate system instead of polar coordinate information on the polar coordinate system. The outer corners of the region of interest (indicated by a line segment) with respect to extracted features in the image information of the background (indicated by a blurred image) shown in FIG. 21 are set as nodes of the region of interest (i.e., ①②③④⑤⑥, see FIG. 21), and coordinates of nodes of the region of interest (i.e., ①②③④⑤⑥) from the center ($P_{mean}$) of the region of interest are expressed as Cartesian coordinates (ni=(ui,vi)). FIG. 17 schematically shows a region of interest in image information wherein U-V denotes a coordinate axis in the image information, $P_{mean}$ denotes a center point of a target region of interest, and ni=(ui,vi) denotes Cartesian coordinates representing position coordinates of each node of the region of interest. In addition, the size ($\sigma_{m1}, \sigma_{m2}$) and the direction (φ, see FIGS. 17 and 22) of the principal axis of the region of interest, which will be described later, are applied identically in confirming the coordinates of nodes of the region of interest regardless of the polar coordinate system or the Cartesian coordinate system.

In addition, the control unit 300 performs the ROI size confirmation step S233 after the ROI node distribution confirmation step is completed. The size of the region of interest may be calculated from the total number of pixels occupied by the corresponding region of interest in the image information.

Figure 32:
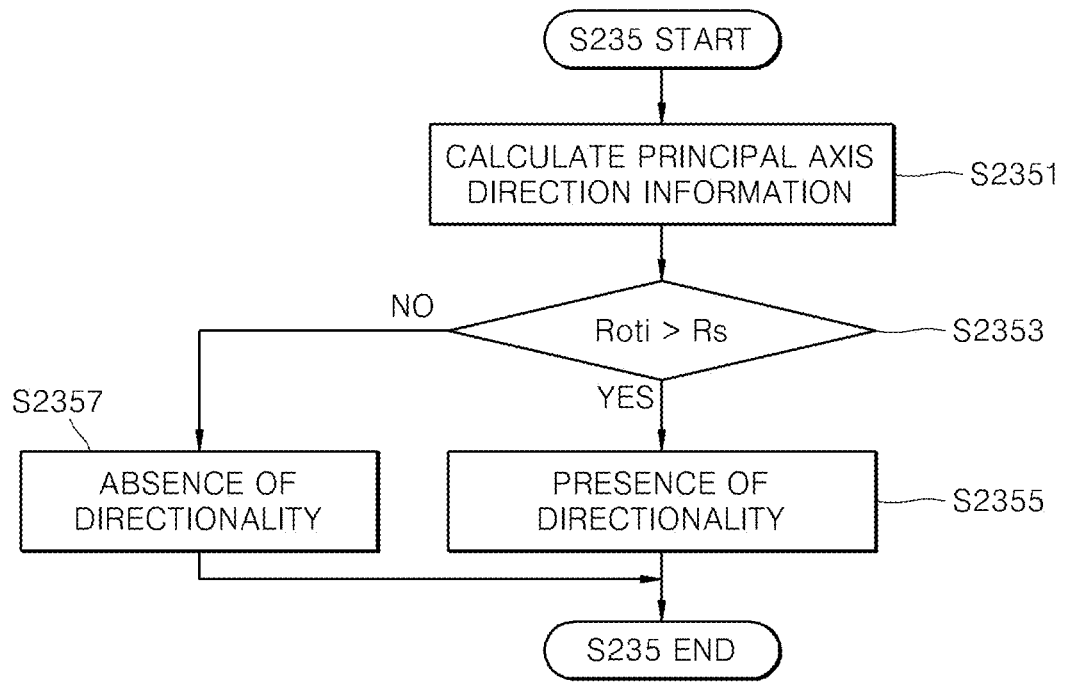
FIG. 32 is a flowchart illustrating one example of an ROI orientation confirmation step of a mobile robot localization method using arbitrarily shaped ceiling features according to an embodiment of the present invention.
Figure 33:
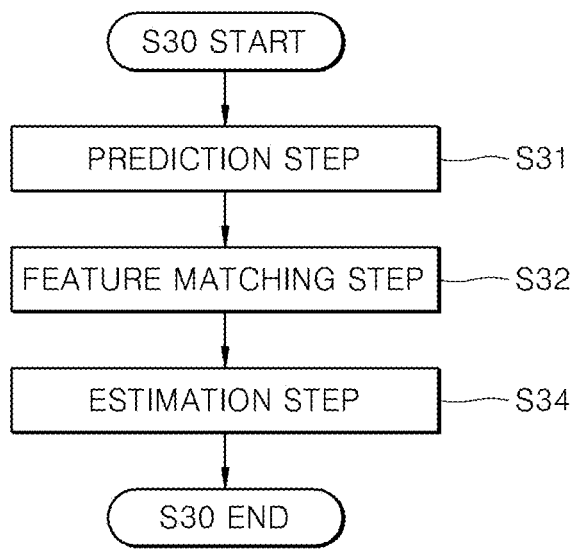
FIG. 33 is a specific flowchart illustrating a localization step of a mobile robot localization method using arbitrarily shaped ceiling features according to an embodiment of the present invention.
Figure 34:
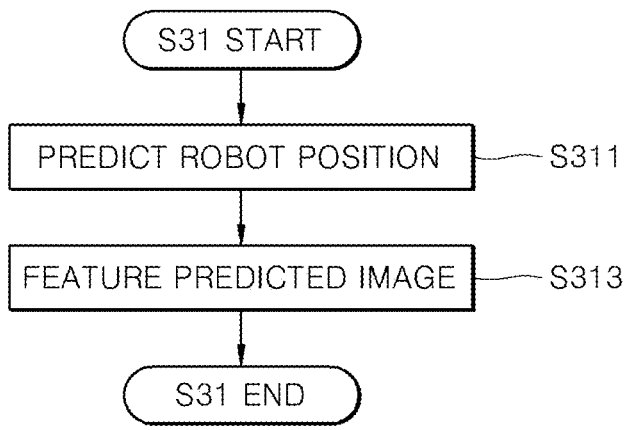
FIG. 34 is a flowchart illustrating a prediction step included in the localization step of a mobile robot localization method using arbitrarily shaped ceiling features according to an embodiment of the present invention.
Figure 35:
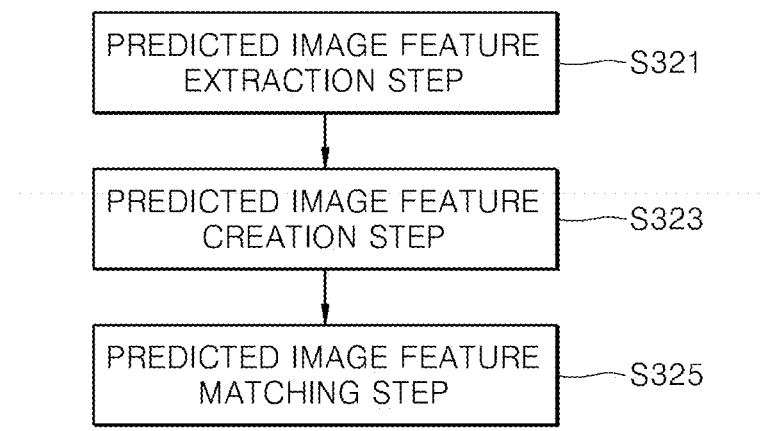
FIG. 35 is a flowchart illustrating a feature matching step included in the localization step of a mobile robot localization method using arbitrarily shaped ceiling features according to an embodiment of the present invention.
Figure 36:
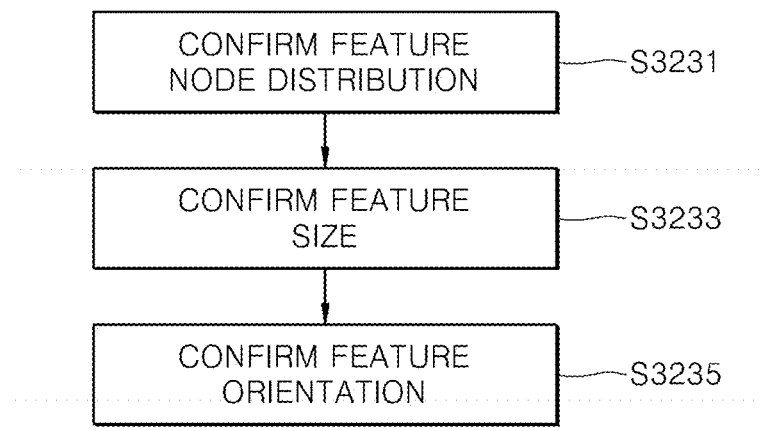
FIG. 36 is a flowchart illustrating a predicted image feature descriptor creation step of the feature matching step included in the localization step of a mobile robot localization method using arbitrarily shaped ceiling features according to an embodiment of the present invention.
Figure 37:
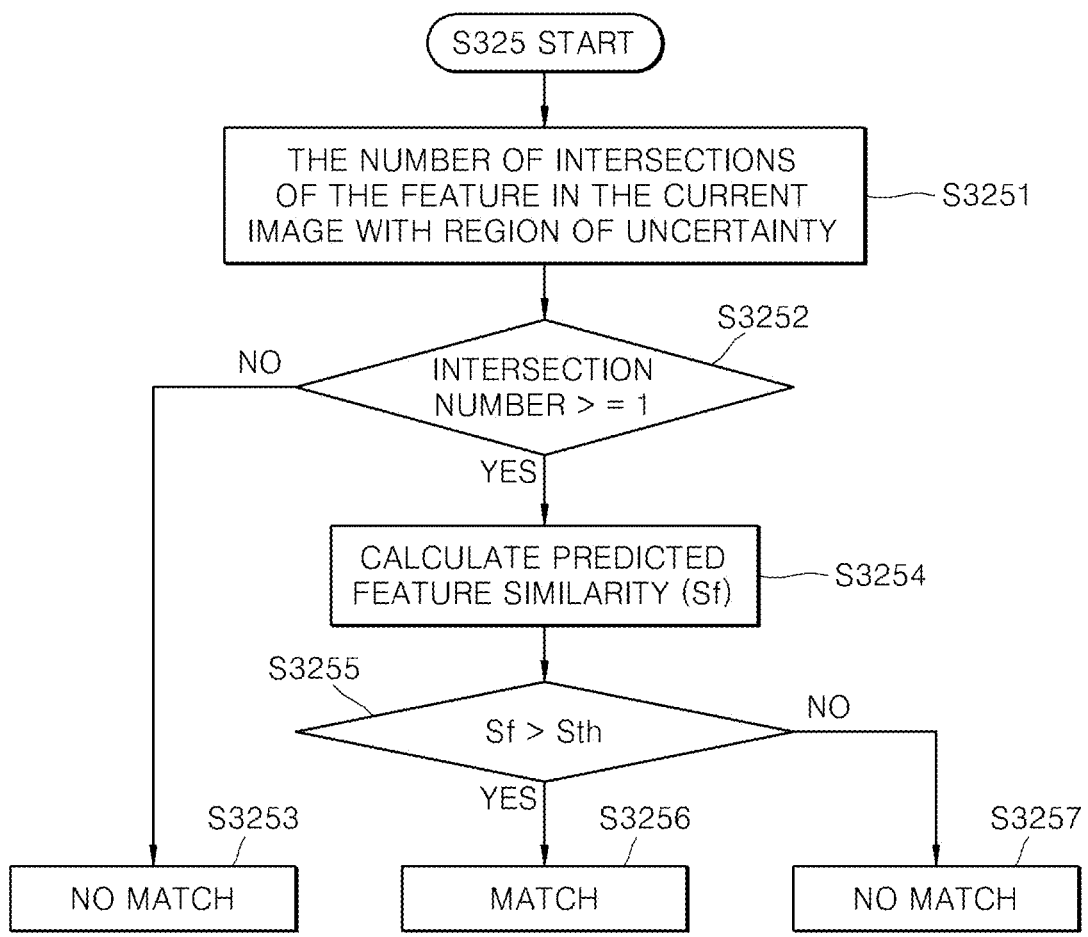
FIG. 37 is a flowchart illustrating a predicted image feature matching step of the feature matching step included in the localization step of a mobile robot localization method using arbitrarily shaped ceiling features according to an embodiment of the present invention.
Figure 38:
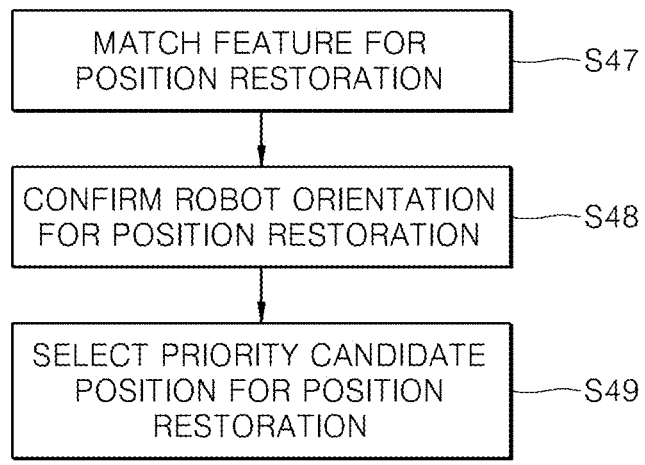
FIG. 38 is a flowchart illustrating a position restoration step in a no-match state of a mobile robot localization method using arbitrarily shaped ceiling features according to an embodiment of the present invention.
Figure 39:
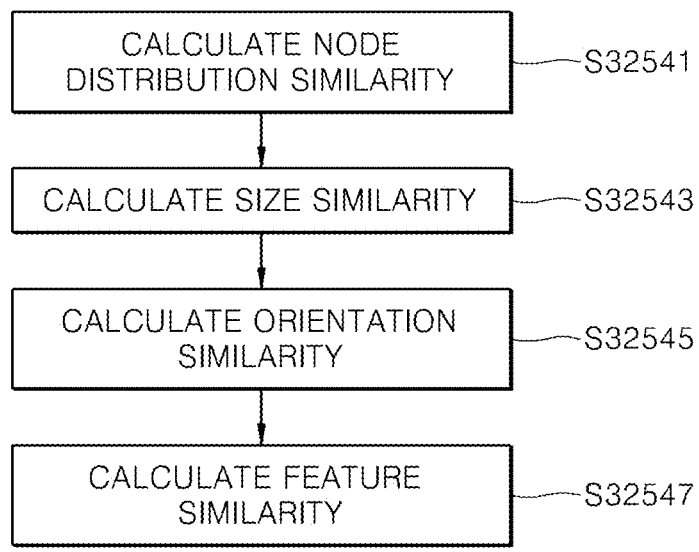
FIG. 39 is a flowchart illustrating a feature similarity calculation step.

In addition, the control unit 300 performs the ROI orientation confirmation step S235 (see FIG. 32) to confirm the orientation among the features of a descriptor of the region of interest, and the size ($\sigma_{m1}, \sigma_{m2}$) and the direction (φ) of the principal axis of the region of interest may be calculated and confirmed using a covariance matrix of pixel distribution. In other words, the ROI orientation confirmation step S235 according to an embodiment of the present invention may further include a principal axis direction information calculation step S2351 of creating a principal axis of the region of interest and a preset principal axis length comparison step S2353. Although it has been described in this embodiment that the principal axis information of the region of interest is calculated in the ROI descriptor creation step S23, various modifications may be made depending on design specifications, such as being calculated in the ROI extraction step S21 and the like.

Figure 19:
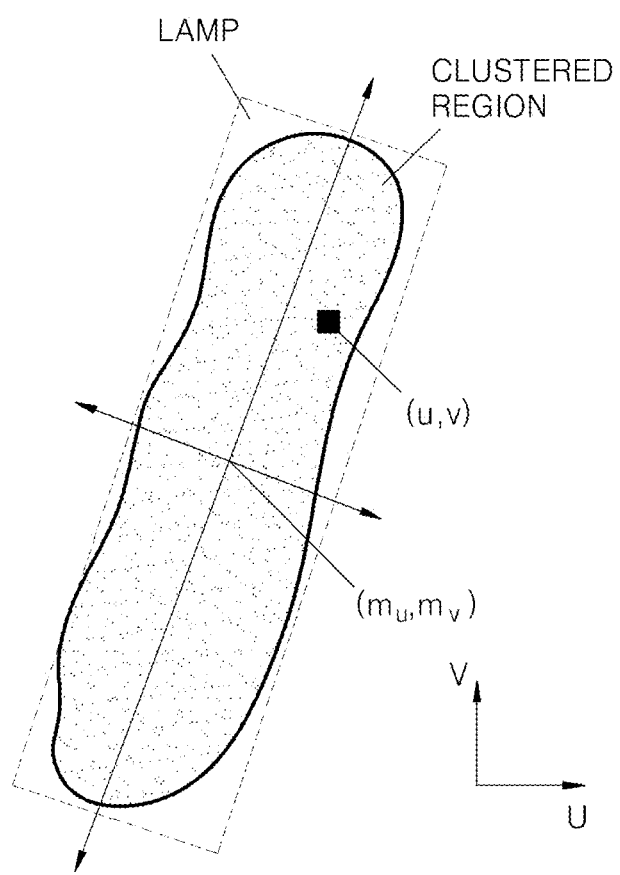
FIGS. 19 and 20 are state diagrams showing a step of extracting the characteristics of arbitrarily shaped ceiling features of a mobile robot localization method using arbitrarily shaped ceiling features according to an embodiment of the present invention.
Figure 20:
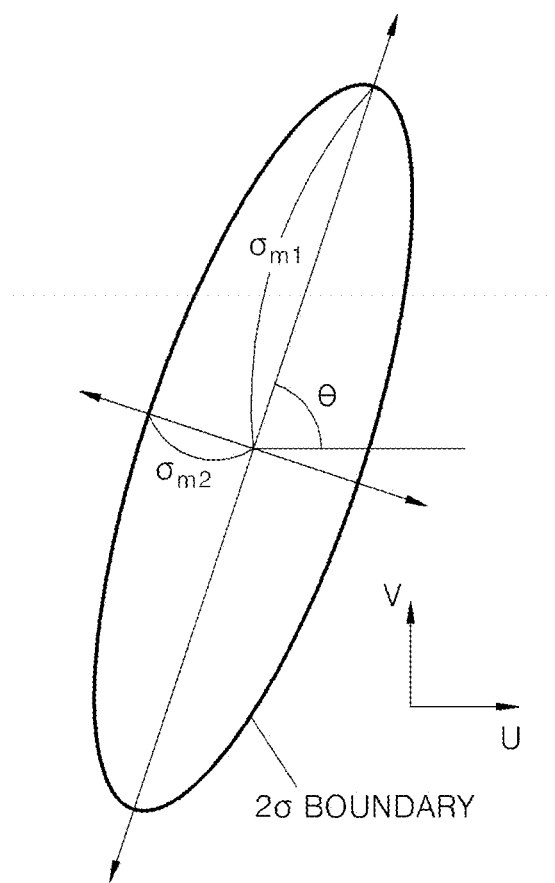

The control unit 300 calculates information on the length and direction of the principal axis of the region of interest. That is, the orientation is extracted from the distribution of points using the concept of mean and variance for the distribution of points belonging to the labeled region of interest of FIG. 19. (u,v) denotes a point in an extremely small region in the U-V coordinate system, cov(u,v) denotes a covariance of the distribution of corresponding points in a corresponding region of the region of interest, and ($m_u, m_v$) indicates an average of the distribution.

$$\text{cov}(u, v) = \begin{bmatrix} E[(u - m_u)^2] & E[(u - m_u)(v - m_v)] \\ E[(v - m_v)(u - m_u)] & E[(v - m_v)^2] \end{bmatrix}$$

$$\text{cov}(u, v) = M^T \begin{bmatrix} \sigma_{m1}^2 & 0 \\ 0 & \sigma_{m2}^2 \end{bmatrix} M, \quad M = \begin{bmatrix} \cos\phi & -\sin\phi \\ \sin\phi & \cos\phi \end{bmatrix}$$

wherein M denotes a matrix which rotates distribution of an elliptical shape expressed by $\sigma_{m1}$ and $\sigma_{m2}$ by φ, and $\sigma_{m1}$, $\sigma_{m2}$ and φ, which are the features of the labeled region of interest. i.e., information on the length and direction (orientation) of the principal axis, may be calculated by the following relationships (see FIG. 20):

$$a = E[(u-m_u)^2]$$
$$b = E[(u-m_u)(v-m_v)]^2$$
$$c = E[(v-m_v)]^2$$
$$\phi = \frac{1}{2}\tan^{-1}\left(\frac{2b}{a-c}\right)$$
$$\sigma_{m1} = \sqrt{a+b\tan\phi},$$
$$\sigma_{m2} = \sqrt{c-b\tan\phi}$$

The features of a region of interest are calculated based on the above relationships, and information φ on the length and direction of the principal axis may be decided to be $\sigma_{m1}$ and $\sigma_{m2}$ from the relationships as features of a corresponding region of interest as shown in FIG. 17.

A ratio $R_{ori}$ of the principal axis length may be calculated from the principal axis length as follows:

$$R_{ori} = \sigma_{m1}/\sigma_{m2} \; (\sigma_{m1} > \sigma_{m2})$$

After the principal axis direction information calculation step S2351 is completed, the control unit 300 performs the preset principal axis length comparison step S2353. In the preset principal axis length comparison step S2353, the control unit 300 compares the ratio $R_{ori}$ of the principal axis length among the features of the labeled and extracted region of interest with a ratio Rs of a preset principal axis length previously determined and stored in the storage unit 400. That is, if the calculated ratio $R_{ori}$ of the principal axis length of the region of interest is smaller than the ratio Rs of the preset principal axis length, the control unit 300 determines that principal axis lengths of the long and short directions of the currently labeled region of interest are almost the same and there is no directionality by recognizing them as features of a point and performs a directionality absence setting step S2357 which determines that the corresponding region of interest has no directionality. On the other hand, if the ratio $R_{ori}$ of the principal axis length of the region of interest is greater than the ratio Rs of the preset principal axis length, the control unit 300 determines that there is a difference between the principal axis lengths of the long and short directions of the currently labeled region of interest and the region of interest has directionality, and performs a directionality presence setting step S2355 which determines that the corresponding region of interest has directionality. Such directionality of a region of interest may increase the localization speed in a localization step described below if a corresponding region of interest is decided to be a feature and drastically narrows candidate positions where the mobile robot using arbitrarily shaped ceiling features is positioned in a position restoration step so that rapid position restoration can be accomplished.

Such a descriptor of a region of interest may be created for all the regions of interest extracted from the current image information.

After the descriptor is created for a region of interest, the control unit 300 performs the ROI robustness confirmation step S25 of confirming robustness of the region of interest. That is, it is confirmed whether or not the region of interest is set as a feature used in the localization step based on the descriptor of the region of interest and a preset reference stored in the storage unit 400, i.e., whether or not the region of interest has a value as a feature. If it is confirmed that the region of interest has robustness within the current image information, the control unit 300 determines that the features in the current image information are not the features stored in the storage unit, but new features, through a comparison between the features in the current image information and features in an estimated image in the localization step described below, the descriptor of the region of interest as a new feature may be stored in a feature map later as the characteristics of the feature, i.e., as a descriptor.

The ROI robustness confirmation step S25 includes an ROI similarity calculation step S251, an ROI uniqueness calculation step S253, and an ROI robustness determination step S257 and S259. The ROI similarity calculation step S251 calculates a similarity defining a resemblance between regions of interest extracted from the current image information, i.e., processed image information. This similarity is used to determine whether or not a feature of a region of interest is useful as a feature of a ceiling image by confirming how much the region of interest is similar to other adjacent regions of interest and assigning a weighting factor to a region of interest having a high similarity among the regions adjacent to the region of interest to calculate uniqueness.

The ROI similarity calculation step S251 includes an ROI confirmation step S2510-1, an ROI setting step S2510-2, a node distribution similarity calculation step S2511, a size similarity calculation step S2513, an orientation similarity calculation step S2515, an ROI similarity calculation step S2517, a remaining comparison ROI determination step S2518, and an remaining ROI determination step S2519.

Such an ROI similarity calculation step S251 is performed on all the regions of interest existing in the current image information. That is, if a plurality of regions of interest exists in the current image information, similarity between regions of interest is calculated by setting any one of the regions of interest as a target region of interest and comparing the set region of interest with the remaining regions of interest. Thereafter, similarity between the remaining regions of interest is calculated by setting another region of interest as a new target region of interest, and similarity between all the regions of interest is calculated by repetitively performing this operation. That is, if there are $M_{roi}$ regions of interest in the current image information, the similarity S is calculated $M_{ori}C_2$ times. In this embodiment, the number of regions of interest in the current image information is expressed as $M_{roi}$, and M is used as a reference symbol for representing a target region of interest, and Q is used to express a comparison region of interest compared with the target region of interest, and M is incremented in the control process to have a value selected from 1 to $M_{roi}$. Although Q is incremented to M+1, M+2, ..., M+$M_{roi}$ and is set to have a relation to be reset to M+1 when a new M is set, various modifications may be made within a range of performing a comparison between all the regions of interest. In addition, although the symbols such as Q, M and the like are used to represent the number of target regions of interest or comparison regions of interest in the current image information, or the number of regions of interest in a predicted image, other symbols such as a, b and the like may be used in some cases such as display or the like on a Cartesian coordinate system in order to facilitate the understanding of the present invention wherein a and b are incremented to a value selected from 1 to $b_{roi}$ like Q and M, and a is incremented to b+1, b+2, ..., b+$b_{roi}$ and set to have a relation to be reset to b+1 when a new b is set.

First, the ROI confirmation step S2510-1 is performed to confirm a region of interest in a current image, i.e., current image information, and the number ($M_{roi}$) of regions of interest may be confirmed using extraction of a region of interest performed in the previous step.

Then, the control unit 300 performs the ROI setting step S2510-2, and if a plurality of regions of interest exists in the current image information, a target region of interest is determined among the regions of interest and a comparison region of interest to be compared with the target region of interest is determined among the regions of interest excluding the target region of interest. Since all the regions of interest in the current image information are compared with one another, it is preferable to sequentially replace the target region of interest and the comparison region of interest in the control flow.

Figure 25:
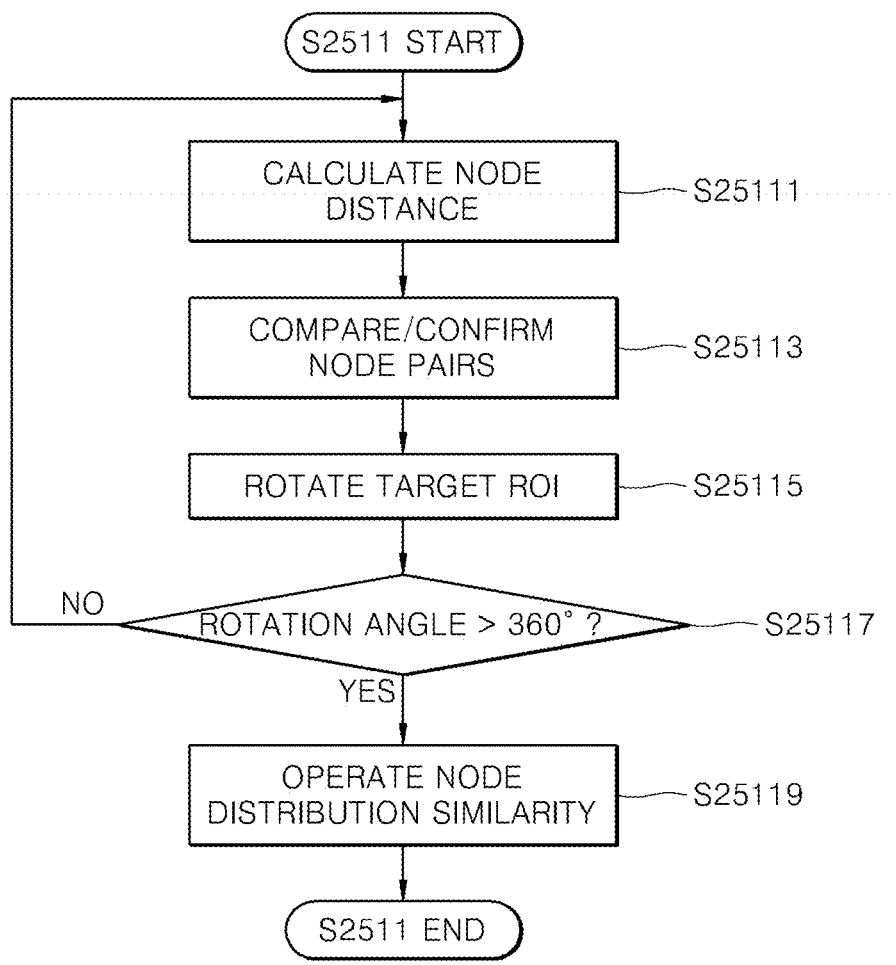
FIG. 25 is a flowchart showing a node distribution similarity confirmation step of a mobile robot localization method using arbitrarily shaped ceiling features according to an embodiment of the present invention.

First, the node distribution similarity calculation step S2511 calculates a similarity between node distributions of regions of interest in the current image information. That is, the similarity between node distributions is calculated among all the regions of interest included in the current image information. FIG. 25 shows a detailed flow of the node distribution similarity calculation step S2511, and the node distribution similarity calculation step S2511 includes a node distance calculation step S25111, a node pair comparison and confirmation step S25113, a target ROI rotation step S25115, a target ROI rotation completion determination step S25117, and a node distribution similarity operation step S25119. In this embodiment, since positions of nodes in a region of interest obtained from the current image information also rotate according to a rotation state of a mobile robot device using arbitrarily shaped ceiling features, a minimum error calculation method is used to find a point which minimizes a difference between node distributions of other regions of interest compared while rotating the target region of interest from 0° to 360° about the center point ($P_{mean}$) of the target region of interest.

In this embodiment, when a distance between nodes of a target region of interest and another comparison region of interest has a value smaller than a preset minimum node distance while rotating the target region of interest by a preset angle ranging from 0° to 360°, corresponding nodes are designated as a node pair, and the coordinates of the nodes and the number of node pairs are stored. Thereafter, when rotation of the target region of interest by an angle ranging from 0° to 360° is completed, similarity is calculated from the number of node pairs and the coordinates of the nodes constituting the node pairs at a stored corresponding rotation angle.

More specifically, the control unit 300 performs the node distance calculation step S25111, and a distance between nodes is calculated using polar coordinate information between nodes. Then, the control unit 300 performs the node pair comparison and confirmation step S25113 of comparing the node distance d with a similar range distance $d_{sim}$ preset and stored in the storage unit 400, confirming the number N of node pairs having the node distance d smaller than the similar range distance $d_{sim}$, and storing coordinate information of the node pairs.

Then, the control unit 300 performs the target ROI rotation step S25115 of rotating a target region of interest by a preset angle about the center point ($P_{mean}$). In the ROI rotation step S25115, the control unit 300 rotates the target region of interest by a preset angle (although it is set to 1° in this embodiment, it is not limited thereto) about the center point ($P_{mean}$). Then, the control unit 300 performs the ROI rotation completion determination step of confirming whether or not the rotation angle of the target region of interest arrives at 360° by performing step S25117. If it is determined that the rotation angle of the target region of interest does not arrive at 360° in step S25117, the control unit 300 returns the control flow to step S25111 (the node distance calculation step) and repetitively performs the step of confirming the node distance and the node pair between the rotated target region of interest and other comparison regions of interest. On the other hand, if it is determined that the rotation angle of the target region of interest arrives at 360° in step S25117, the control unit 300 proceeds to step S25119 and operates the similarity in node distribution between the target region of interest and the comparison region of interest.

Figure 26:
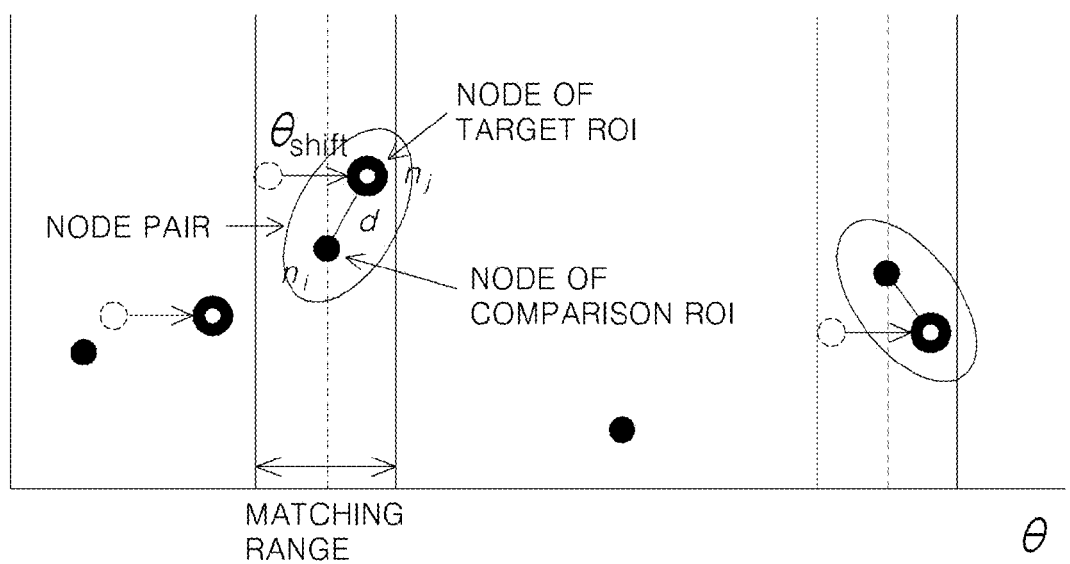
FIG. 26 is a diagrammatic view showing node distribution of a target region of interest and node distribution of a comparison region of interest before and after rotation of the comparison region of interest by a rotation angle.

FIG. 26 shows node distribution of a target region of interest and a comparison region of interest before and after the target region of interest is rotated by a rotation angle. Here, if it is assumed that $\theta_{shift}$ denotes the rotation angle of the target region of interest, $n_j$ denotes a node of the rotating target region of interest, and $n_i$ denotes a node of the comparison region of interest, a distance between the nodes may be expressed as follows:

$$d(n_i, n_j) = \sqrt{(r_i - r_j)^2 + \{(\theta_i - \theta_j - \theta_{shift}) \cdot k\}^2}$$

wherein $n_i = (\theta_i, r_i)$ and $n_j = (\theta j + \theta_{shift}, r_j)$ respectively mean polar coordinates of nodes of a target region of interest and a node of a comparison region of interest, and k is a constant for adjusting a scale of r and $\theta$ expressed as a pixel unit.

As described above, the number of node pairs having d smaller than $d_{sim}$ is set as the number N of node pairs, and node distribution similarity (S;S(M,Q)) is calculated using values of N and $d(n_i, n_j)$ as follows:

$$S_{node}(M, Q) = 1 - \min_{0 \leq \theta_{shift} \leq 2\pi} \frac{1}{N} Q\{d(n_i, n_j)\}^2$$

wherein N denotes the total number of node pairs, and $S_{node}(M,Q)$ means similarity between node distributions of the target region of interest M and the comparison region of interest Q.

After the node distribution similarity calculation step S2511 is completed, the control unit 300 performs the size similarity calculation step S2513 and the orientation similarity calculation step S2515, and a size similarity and an orientation similarity may be calculates as follows:

$$S_{size}(M, Q) = 1 - \frac{|A_Q - A_M|}{A_M}$$

$$S_{ori}(M, Q) = 1 - \frac{|R_Q - R_M|}{R_M}$$

wherein $A_Q$ and $A_M$ respectively denote a size of a comparison region of interest and a size of a target region of interest (the number of internal pixels), and $R_Q$ and $R_M$ respectively denote robustness a comparison region of interest and robustness of a target region of interest (a ratio of a principal axis length). Similarity S between the target region of interest and the comparison region of interest may be calculated using $S_{node}$, $S_{size}$ and $S_{ori}$ (S2517) as follows:

$$S(M, Q) = \frac{w_{node}S_{node} + w_{size}S_{size} + w_{ori}S_{ori}}{w_{total}}$$

wherein $w_{node}$, $w_{size}$, $w_{ori}$ and $w_{total}$ respectively denote a node, a size, a weighting factor of orientation (robustness of orientation), and a sum thereof.

Figure 29:
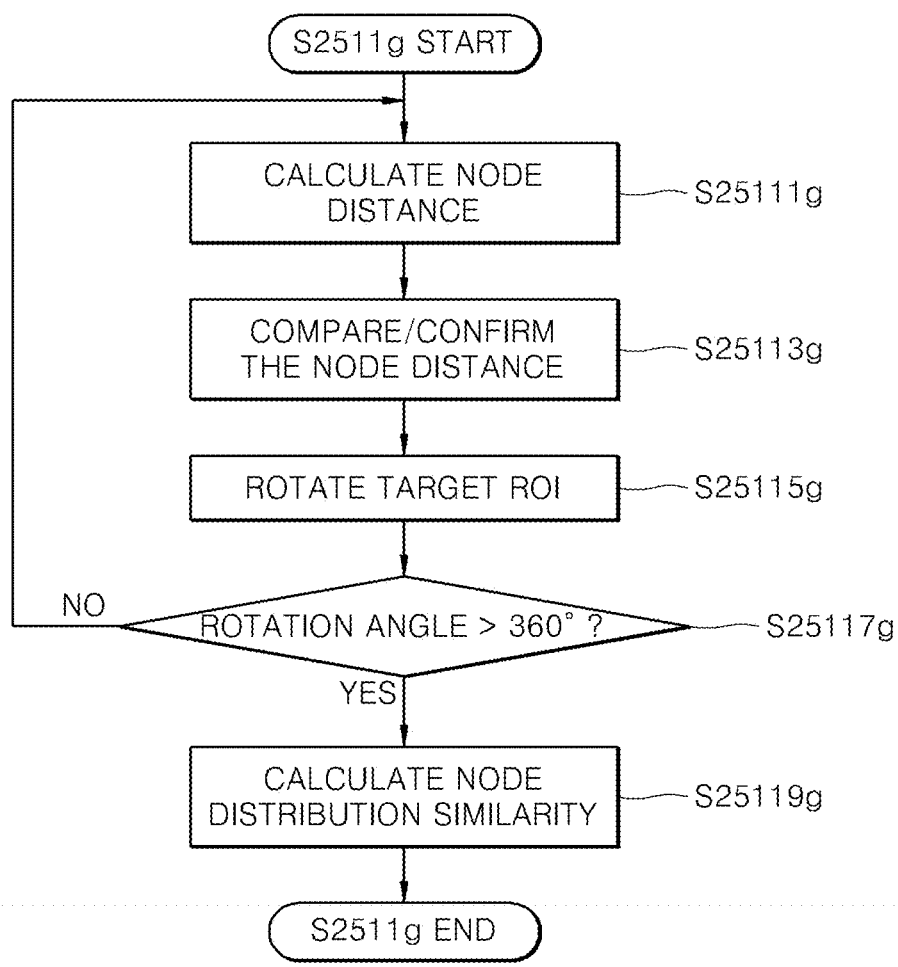

Meanwhile, a node of a region of interest may be expressed as a Cartesian coordinate method other than a polar coordinate method, and in this case, a distance to the node is calculated using Cartesian coordinate information on the node when the control unit 300 performs the node distance calculation step S25111g (see FIG. 29) through a calculation unit.

Then, the control unit 300 performs the node pair comparison and confirmation step S25113g of confirming the number of node pairs having a node distance d smaller than a similar range distance $d_{sim}$ preset and stored in the storage unit 400 and storing coordinate information of the node pairs by comparing the node distance with the similar range distance $d_{sim}$.

Then, the control unit 300 performs the ROI rotation step S25115g for rotating a target region of interest by a preset angle about the center point ($P_{mean}$). In the ROI rotation step S25115g, the control unit 300 rotates the target region of interest by a preset angle (although it is set to 1° in this embodiment, it is not limited thereto) about the center point ($P_{mean}$). Then, the control unit 300 performs the ROI rotation completion determination step of confirming whether or not the rotation angle of the target region of interest arrives at 360° by performing step S25117g. If it is determined that the rotation angle of the target region of interest does not arrive at 360° in step S25117g, the control unit 300 returns the control flow to step S25111g (the node distance calculation step) and repetitively performs the step of confirming the node distance and the node pair between the rotated target region of interest and other compared regions of interest. On the other hand, if it is determined that the rotation angle of the target region of interest arrives at 360° in step S25117g, the control unit 300 proceeds the program to step S25119g and calculates node distribution similarity between the target region of interest and the comparison region of interest.

Figure 30:
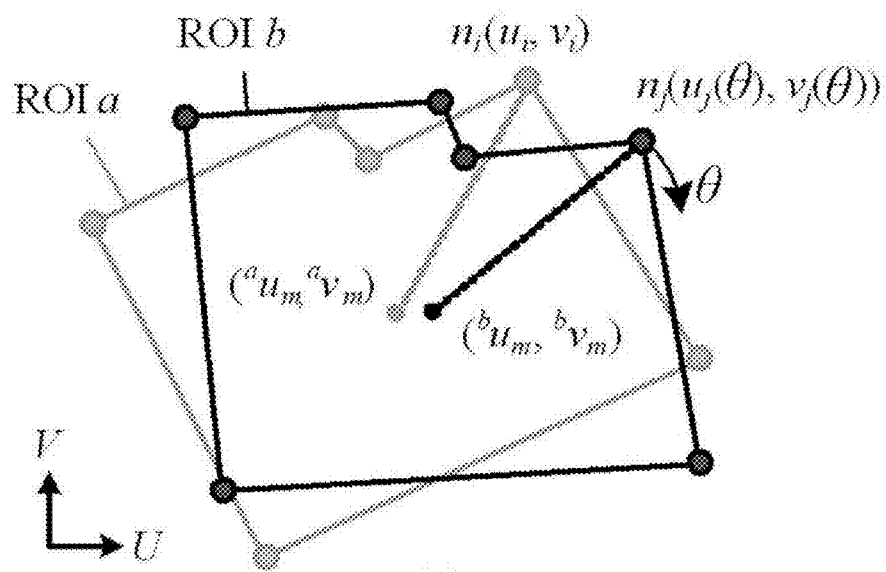
FIG. 30 is a diagrammatic view showing another example of node distribution of a target region of interest and node distribution of a comparison region of interest before and after rotation of the comparison region of interest by a rotation angle.
Figure 31:
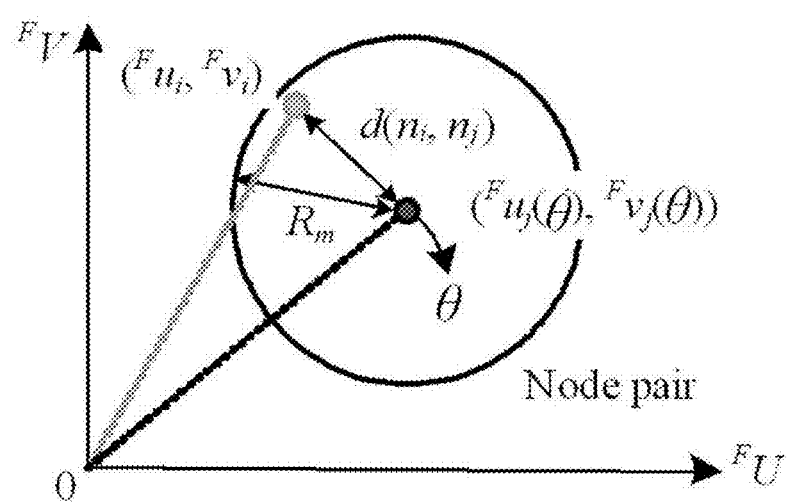
FIG. 31 is a diagrammatic view graphically showing a node distance of a node pair of a target region of interest and a comparison region of interest on an image coordinate system overlapping the centers of FIG. 30.

FIG. 30 shows node distribution of a target region of interest and a comparison region of interest before and after the target region of interest is rotated by a rotation angle, and FIG. 31 shows a node coordinate relationship on an image coordinate system in which centers of a target region of interest and a comparison region of interest are overlapped. Here, $\theta$ denotes the rotation angle of a target region of interest, $R_{OIa}$ denotes a comparison region of interest, $R_{OIb}$ denotes a target region of interest rotating about $P_{mean}=(^{b}u_m, {}^{b}v_m)$, $(u_j, v_j)$ and $(u_j(\theta), v_j(\theta))$ respectively denote positions of a node before and after rotation, $(^{a}u_m, {}^{a}v_m)$ denotes the center of $R_{OIa}$, $n_i=(u_i,v_i)$ and $n_j=(u_j,v_j)$ denote coordinates of nodes i and j of a node pair, and $(^{F}u_i, {}^{F}v_i)$ and $(^{F}u_j(\theta), {}^{F}v_j(\theta))$ denote coordinates of nodes when the center of a region of interest is matched on the image coordinate system.

$$\begin{bmatrix} {}^F u_i \\ {}^F v_i \end{bmatrix} = \begin{bmatrix} u_i - {}^a u_m \\ v_i - {}^a v_m \end{bmatrix}$$

$$\begin{bmatrix} {}^F u_j(\theta) \\ {}^F v_j(\theta) \end{bmatrix} = \begin{bmatrix} u_j(\theta) - {}^b u_m \\ v_j(\theta) - {}^b v_m \end{bmatrix}$$

A distance between them can be expressed as follows:

$$d(n_i, n_j) = \sqrt{\{{}^F u_i - {}^F u_j(\theta)\}^2 + \{{}^F v_i - {}^F v_j(\theta)\}^2}$$

As described above, all the nodes of a target region of interest are rotated by $\theta$, and a distance between the nodes of the target region of interest and comparison target nodes is calculated, and at this point, a value of difference between distributions of two nodes (a value of difference at a point where the difference becomes the minimum) corresponding to the region of interest can be calculated by calculating a mean squared error (MSE) as follows:

$$D = \min_{0 \le \theta \le 2\pi} \frac{1}{N} \sum_{(i,j) \in P} \{d(n_i, n_j)\}^2$$

Wherein D denotes a difference of distribution, N denotes the number of node pairs, and P denotes a set of node pairs, and node distribution similarity $S_{node}(b,a)$ of $R_{OIa}$ which is a comparison region of interest and $R_{OIb}$ which is a target region of interest is calculated using the difference of distribution as follows:

$$S_{node}(b, a) = 1 - \frac{D}{R_m^2}$$

wherein $R_m^2$ denotes a normalized constant, and $S_{node}(b,a)$ denotes a node distribution similarity between the comparison region of interest $R_{OIa}$ and the target region of interest $R_{OIb}$.

After the node distribution similarity calculation step S25119 is completed, the control unit 300 performs the size similarity calculation step S2513g and the orientation similarity calculation step S2515g, and size similarity and orientation similarity may be calculated as follows:

$$S_{size}(b, a) = 1 - \frac{|A_a - A_b|}{\max(A_a, A_b)}$$

$$S_{ori}(b, a) = 1 - \frac{|R_{ori,a} - R_{ori,b}|}{\max(R_{ori,a}, R_{ori,b})}$$

wherein $A_a$ and $A_b$ respectively denote a size of a comparison region of interest and a size of a target region of interest (the number of internal pixels), and $R_{ori,a}$ and $R_{ori,b}$ respectively denote robustness of orientation of a comparison region of interest and robustness of orientation of a target region of interest (a ratio of a principal axis length). Similarity S between the target region of interest and the comparison region of interest may be calculated using $S_{node}$, $S_{size}$ and $S_{ori}$ (S2517g) as follows:

$$S(b, a) = \frac{w_{node} S_{node} + w_{size} S_{size} + w_{ori} S_{ori}}{w_{total}}$$

wherein $w_{node}$, $w_{size}$, $w_{ori}$ and $w_{total}$ respectively denote a node, a size, a weighting factor of orientation (orientation robustness) and a sum thereof.

Then, the control unit 300 determines whether or not there exists a remaining comparison region of interest which is not compared with the target region of interest among the regions of interest in the current image by performing the remaining comparison ROI determination step S2518. That is, it is determined whether or not a comparison ROI coefficient Q is greater than $M_{roi}$. If Q is equal to or smaller than $M_{roi}$ (if there exists a remaining comparison region of interest), the control unit 300 returns the control flow to step S2518-1 to increment Q and proceeds to the program to step S2510-2.

On the other hand, if it is determined in step S2518 that the comparison ROI coefficient Q is greater than $M_{roi}$, i.e., if a remaining comparison region of interest does not exist, the control unit 300 proceeds the program to step S2519 and performs the remaining ROI determination step S2519. That is, it is determined whether or not there exists a remaining region of interest which is not selected as a target region of interest among the regions of interest in the current image, and the control unit 300 determines whether or not a target ROI coefficient M is greater than $M_{roi}$. If the target ROI coefficient M is greater than $M_{roi}$, it is determined that there is no remaining region of interest any more, and step S251 is terminated. On the other hand, if the target ROI coefficient M is equal to or smaller than $M_{roi}$, the control unit 300 determines that there exists a remaining region of interest, and proceeds the program to step S2519-1 after incrementing the target ROI coefficient M by 1 and repeats this procedure.

In this embodiment, although Q, M, $M_{roi}$ and the like are used in step S2518, Q, M and $M_{roi}$ may be replaced with a, b and $b_{roi}$ if they are expressed on the Cartesian coordinate system as described above.

After step S251 is completed, the control unit 300 proceeds the program to step S253 and performs the ROI uniqueness calculation step S253. That is, the control unit 300 calculates uniqueness U of a region of interest, which is calculated by assigning a weighting factor to the similarity between a certain region of interest and another region of interest among the regions of interest in the current image. The reason of calculating the uniqueness of a region of interest is to solve a problem in that stability of localization is degraded due to lowered usefulness of the region of interest as a feature used in the localization step later if another region of interest having a similar shape exists at a position adjacent to any one of the regions of interest.

Figure 27:
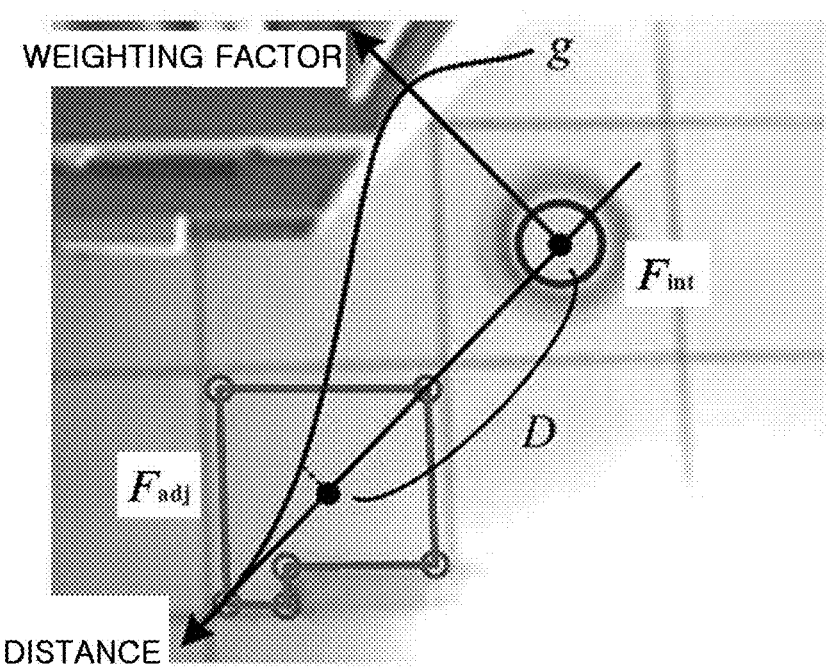
FIGS. 27 and 28 are diagrammatic views showing uniqueness and a weighting factor used for the uniqueness of a mobile robot localization method using arbitrarily shaped ceiling features according to an embodiment of the present invention.
Figure 28:
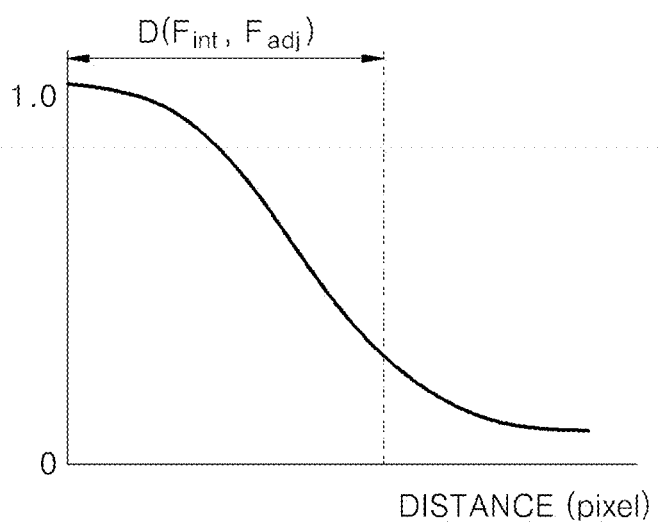

FIG. 27 shows a diagram of a Gaussian weighting factor according to a Euclidian distance function between regions of interest, and FIG. 28 shows a uniqueness diagram according to a Euclidian distance. The uniqueness of a region of interest is calculated as follows:

$$U(F_{int}) = \min\{1 - S(F_{int}, F_{adj}) \cdot g(D(F_{int}, F_{adj}))\}$$

wherein $F_{int}=(u_{int}, v_{int})$ denotes a region of interest to be currently compared, $F_{adj}=(u_{adj}, v_{adj})$ denotes features adjacent to $F_{int}$, S denotes similarity between the regions of interest described above, D denotes a Euclidian distance function between $F_{int}$ and $F_{adj}$ (see FIG. 28), f denotes a function for calculating a Gaussian weighting factor according to a distance, and U denotes uniqueness of a region of interest.

As for the calculated uniqueness of a region of interest, the control unit 300 performs a uniqueness determination step S255 of determining whether or not the calculated uniqueness of a region of interest has stability as a feature by comparison with a preset uniqueness $U_{thre}$ preset and stored in the storage unit 400 and performs the ROI robustness determination step S257 and S259 of deciding whether or not to use the region of interest as a feature of a region of interest according to a result of the determination in step S255. If it is determined in step S255 that the calculated uniqueness of the region of interest is higher than the preset uniqueness, the control unit 300 confirms a possibility of using the region of interest as a feature at the localization step later S257 by confirming that the region of interest has robustness and thus can be used as a feature. On the other hand, if it is determined in step S255 that the calculated uniqueness of the region of interest is lower than the preset uniqueness, the control unit 300 prevents the use of the region of interest as a feature in the localization step later S259 by confirming that the region of interest does not have robustness and thus cannot be used as a feature.

The region of interest having robustness is recognized as an extracted feature through the procedure described above, and the control unit 300 performs the localization step S30.

The control unit 300 performs localization of the mobile robot device 10 by using extracted arbitrarily shaped features including an arbitrarily shaped ceiling feature, and the localization step S30 includes a prediction step S31, a feature matching step S32 and an estimation step S33. Although the prediction, feature matching and estimation steps follow a general method of a Kalman filter or an extended Kalman filter, the localization step according to this embodiment has a difference in that the characteristic of the arbitrarily shaped ceiling features is used and the feature matching is performed through a descriptor assigned to the arbitrarily shaped features.

Figure 41:
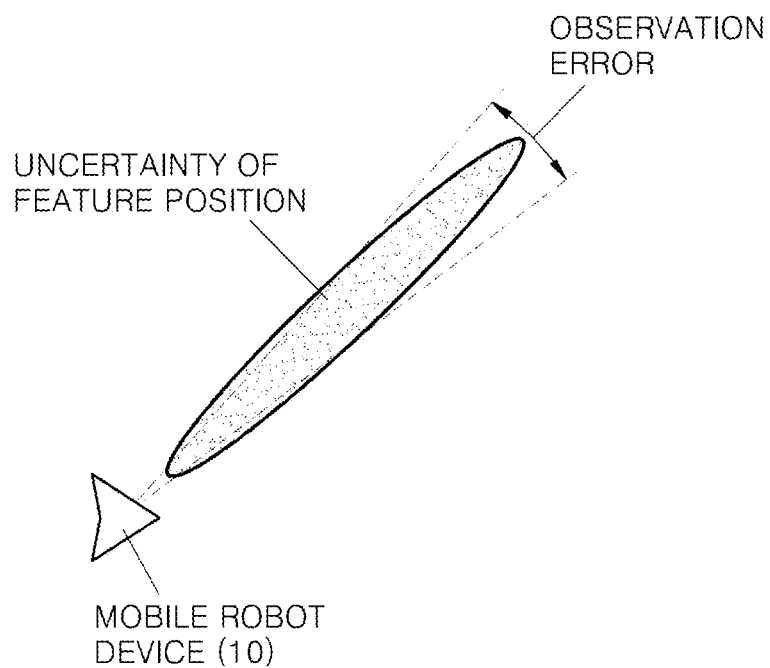
FIGS. 41 to 43 are state diagrams schematically showing reduction of uncertainty of a feature according to movement in a mobile robot localization method using arbitrarily shaped ceiling features according to an embodiment of the present invention.
Figure 42:
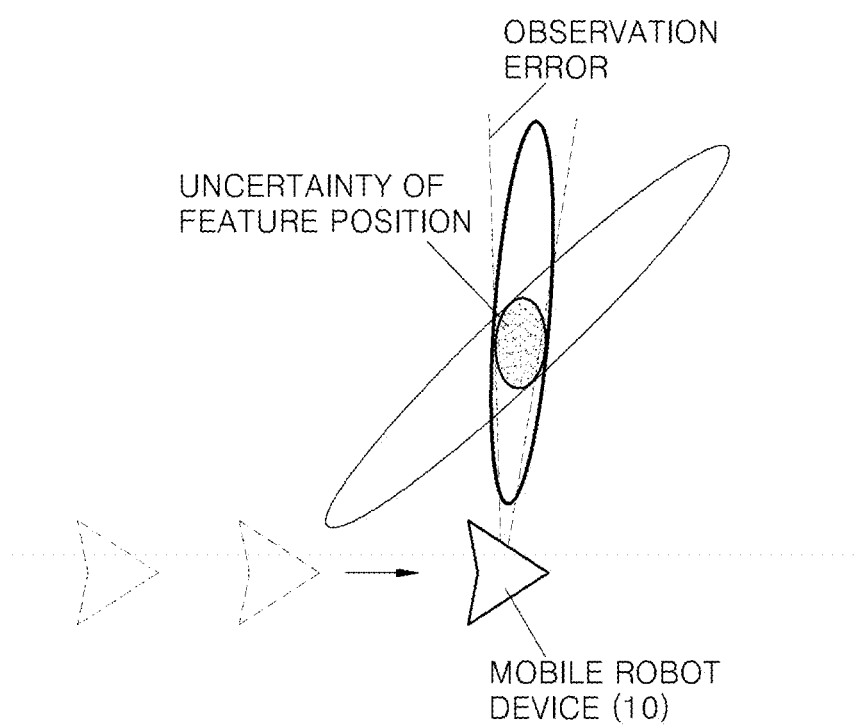
Figure 43:
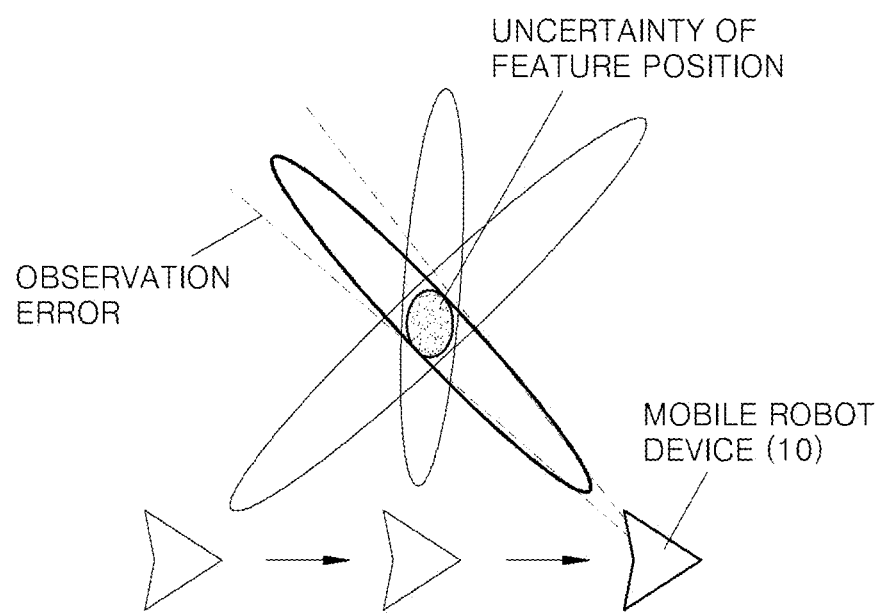

That is, features including the arbitrarily shaped features extracted from the image information of the mobile robot device 10 are used. Since the image input unit 100 provided in this embodiment is implemented as a monocular camera and thus does not directly measure a distance to a feature and knows only orientation information on a landmark, the distance to a feature is stochastically calculated through a number of estimation procedures. Since the image input unit 110 involves an observation error of its own, a region which cannot have a feature, i.e., a region of uncertainty, is expressed in an elliptical shape of Gaussian distribution as shown in FIG. 41. When the region is observed several times while varying the position, uncertainty of the feature converges as shown in FIGS. 42 and 43. Like this, a position of the mobile robot device 10 is estimated based on the position of the observed feature.

A state vector of EKF including the feature used for the estimation can be expressed as follows:

$$X = [X_R, X_{C1}, \ldots, X_{Cn}, X_{L1}, \ldots, X_{Lm}]$$

$$X_R = [{}^G x_R, {}^G y_R, {}^G \theta_R]$$

$$X_L = [{}^G x_L, {}^G y_L, {}^G z_L, {}^G \phi_L]$$

$$X_C = [{}^G x_C, {}^G y_C, {}^G \theta_C]$$

wherein $X_R$ denotes a position (a position and an orientation on the absolute coordinate system) of the mobile robot device 10 using arbitrarily shaped ceiling features, $X_L$ denotes a position (a position and an azimuth on the absolute coordinate system) of arbitrarily shaped ceiling features on a three-dimensional space, and $X_C$ denotes a position of a corner feature on a three-dimensional space. Although $X_C$ is added in this embodiment, various modifications can be made, such as taking a structure of excluding the $X_C$ or adding other features such as an illumination feature.

In the global coordinate system, positions $({}^G x_L, {}^G y_L, {}^G z_L)$ of an arbitrarily shaped feature are expressed as polar coordinates $({}^I r_L, {}^I \theta_L)$ in image information obtained from the image input unit, and an orientation ${}^G \Phi_L$ of the arbitrarily shaped feature with respect to the x-axis of the global coordinate system (see FIG. 45) can be expressed as an orientation ${}^I \Phi_L$ with respect to the V-axis in the image information obtained from the image input unit. A covariance matrix representing uncertainty of the state vector described above is expressed as follows:

$$P = \begin{bmatrix} P_R & P_{RC} & P_{RL} \\ P_{CR} & P_C & P_{CL} \\ P_{LR} & P_{LC} & P_L \end{bmatrix}$$

wherein $P_R$ denotes a covariance of the position (a position and an azimuth) of the mobile robot device 10 using arbitrarily shaped ceiling features, $P_C$ and $P_L$ respectively denote covariance of a corner feature and a position (a position and/or an orientation) of an arbitrarily shaped ceiling feature.

$P_{RC}$, $P_{RL}$, $P_{CR}$, $P_{CL}$, $P_{LR}$ and $P_{LC}$ which are off-diagonal elements of a covariance matrix P mean a cross covariance matrix related to $P_R$, $P_C$ and $P_L$.

First, in the prediction step S31, the control unit 300 creates a predicted position of the mobile robot device at the current stage and a predicted image of an arbitrarily shaped feature at the predicted position, based on an estimated position of the mobile robot device 10 using arbitrarily shaped ceiling features and an estimated image of an arbitrarily shaped ceiling feature at the previous stage, which are calculated based on image information obtained from the image input unit 110 of the mobile robot device 10, and a signal of the encoder sensing unit 200 obtained when the mobile robot device moves from the previous stage to the current stage.

The predicted position of the mobile robot device at the current stage and the predicted image of the arbitrarily shaped ceiling feature at the predicted position are derived from a predicted state vector of EKF. That is, the predicted position of the mobile robot device 10 using arbitrarily shaped ceiling features at the current stage of time t and the predicted image of the arbitrarily shaped ceiling feature at the predicted position may be derived by applying odometry information containing a moving distance and a moving angle changed between time points of t−1 and t, to the state vector including an estimated position estimated at the previous stage of time t−1. The relationship between the state vector $\hat{X}_t^-$ and the covariance matrix $P_t^-$ is expressed as follows:

$$\hat{X}_t^- = f(\hat{X}_{t-1}, u_t)$$

$$= \begin{bmatrix} {}^G\hat{x}_{R,t-1} \\ {}^G\hat{y}_{R,t-1} \\ {}^G\hat{\theta}_{R,t-1} \\ \hat{X}_{C,t-1} \\ \hat{X}_{L,t-1} \end{bmatrix} + \begin{bmatrix} \frac{\Delta s_{r,t}+\Delta s_{l,t}}{2}\cos\left({}^G\hat{\theta}_{R,t-1} + \frac{\Delta s_{r,t}-\Delta s_{l,t}}{2b}\right) \\ \frac{\Delta s_{r,t}+\Delta s_{l,t}}{2}\sin\left({}^G\hat{\theta}_{R,t-1} + \frac{\Delta s_{r,t}-\Delta s_{l,t}}{2b}\right) \\ \frac{\Delta s_{r,t}-\Delta s_{l,t}}{b} \\ 0 \\ 0 \end{bmatrix}$$

$$P_t^- = \nabla F_x P_{t-1} \nabla F_x^T + \nabla F_u Q \nabla F_u^T$$

$$Q = \begin{bmatrix} k_r|\Delta s_r| & 0 \\ 0 & k_l|\Delta s_l| \end{bmatrix}$$

wherein f denotes a dynamic model of the mobile robot device 10 using arbitrarily shaped ceiling features.

Input $u_t = (\Delta s_{r,t}, \Delta s_{l,t})$ denotes moving distances of left and right driving wheels of the mobile robot device 10 using arbitrarily shaped ceiling features from the previous stage of time t−1 to the current stage of time t ($\Delta s_{r,t}$ is a moving distance of the right driving wheel and $\Delta s_{l,t}$ is a moving distance of the left driving wheel), b denotes a distance between the driving wheels, and $\hat{X}_{L,t-1}$ and $\hat{X}_{R,t-1}$ denote an estimated position (a position and an orientation) of an arbitrarily shaped feature and an estimated position of a corner feature, which are estimated at time t−1. When other features such as the corner feature and the like are not used, state variables related to these features may be removed. In addition, an estimated image of an arbitrarily shaped feature at the previous stage may be derived from the estimated position of an arbitrarily shaped feature. In addition, Q denotes a process noise, and $\nabla F_x = \partial f/\partial X$ and $\nabla F_u = \partial f/\partial u$ respectively denote a Jacobian matrix of f having a nonlinear relationship, the superscript '−' denotes a predicted state which is not updated, and kr and kl respectively indicate a constant related to an interaction between the right and left driving wheels and the bottom surface where the mobile robot device 10 using arbitrarily shaped ceiling features operates.

That is, the control unit 300 calculates a predicted state vector $\hat{X}_t^-$ at the current stage including a predicted position of the mobile robot device using a moving distance ut of the mobile robot device 10 using arbitrarily shaped ceiling features obtained from the encoder sensing unit as a signal and an estimated position $\hat{X}_{t-1}$ of the mobile robot device 10 using arbitrarily shaped ceiling features at the previous stage calculated from the image information obtained from the image input unit 100, and a predicted image of the arbitrarily shaped ceiling feature predicted in the current state (time t) may be calculated through the arithmetic unit 500 by grasping a predicted position of the arbitrarily shaped feature from the predicted state vector.

Then, the control unit 300 performs the feature matching step S32. That is, the control unit 300 compares particularly an arbitrarily shaped feature among the features in the predicted image which becomes a predicted state vector obtained using the estimated state vector of the mobile robot device 10 using arbitrarily shaped ceiling features at the previous stage obtained in the prediction step S31 with an arbitrarily shaped feature obtained by extracting from the current image information obtained and processed through the image input unit in the feature extraction step, and confirms whether or not the compared arbitrarily shaped features are matched. That is, whether or not an arbitrarily shaped feature in a predicted image matches an arbitrarily shaped feature in the current image is confirmed by comparison. To this end, the feature matching step S32 includes a predicted image feature extraction step S321, a predicted image feature descriptor creation step S323 and a predicted image feature matching step S325. If the control unit 300 determines that an arbitrarily shaped feature in a predicted image does not match an arbitrarily shaped feature extracted from the image information obtained from the image input unit through the feature extraction step of step S20 in the feature matching step S32, the arbitrarily shaped feature in the image information obtained from the image input unit is determined to be a new feature which is not stored in a feature map stored in the storage unit 400, and set and stored in the feature map as a new feature.

An arbitrarily shaped feature in a predicted image is extracted in the predicted image feature extraction step S321 of the feature matching step S32, and then, the control unit 300 performs creation of a predicted image feature descriptor in step S323. Here, although an expression of extracting a feature in the predicted image and creating a descriptor is used, information on an arbitrarily shaped ceiling feature existing in the predicted image can be obtained from an estimated position and an estimated image of the mobile robot device 10 at the previous stage, so that whether or not an arbitrarily shaped feature exists in the predicted image may be derived from feature information including an arbitrarily shaped feature in the feature map stored in the storage unit 400, and a descriptor of an arbitrarily shaped feature existing in the predicted image may be rapidly derived from the feature information stored in the storage unit 400.

Then, the control unit 300 performs the predicted image feature matching step S325 where an arbitrarily shaped feature in image information extracted in the feature extraction step S20 is compared with an arbitrarily shaped feature in a predicted image derived through steps S321 and S323 to confirm whether or not they are matched with each other.

The predicted image feature matching step S325 includes a predicted intersection number confirmation step S3251, a predicted intersection number determination step S3252, a predicted feature similarity calculation step S3254, a feature similarity comparison step S3255, a feature similarity confirmation step S3256 and S3257. First, the control unit 300 confirms the predicted number of intersections in which an extracted arbitrarily shaped feature in the image information intersects a region of uncertainty of an arbitrarily shaped feature in the predicted image. That is, the arbitrarily shaped feature in the predicted image exists in the region of uncertainty as a stochastical distribution. The control unit 300 confirms whether or not there is the number of intersections in which the position of an arbitrarily shaped feature in the current image information exists in the region of uncertainty of an arbitrarily shaped feature in the predicted image and intersects the arbitrarily shaped feature of the region of uncertainty (S3251). If it is determined in step S3251 that the predicted number of intersections is zero, the control unit 300 determines it to be a no-match state in which there is no possibility that the arbitrarily shaped feature existing in the current image information will match any arbitrarily shaped feature in the predicted image (S3253). That is, the control unit 300 determines this to be a state in the mobile robot device is in an extreme situation, i.e., performs an abnormal operation due to an external shock and the like, and the control flow proceeds to step S40 where the control unit 300 performs the position restoration step S40 which will be described later.

On the other hand, if is determined in step S3252 that the predicted number of intersections is not zero, the control unit 300 determines that the mobile robot device 10 is in a normal movement state, and the control flow proceeds to step S3254 where the control unit 300 performs the predicted feature similarity calculation step S3254. The predicted feature similarity calculation step S3254 includes a node distribution similarity calculation step S32541, a size similarity calculation step S32543, an orientation similarity calculation step S32545, and a feature similarity calculation step S32547. The predicted feature similarity calculation step S3254 is nearly similar to the ROI similarity calculation step S251 except that the region of interest (ROI) of the ROI similarity calculation step S251 is changed to the arbitrarily shaped feature and a comparison target is changed from the comparison between the regions of interest in the current image to the intersection between the arbitrarily shaped feature in the current image information and the region of uncertainty of the arbitrarily shaped feature in the predicted image.

Figure 40:
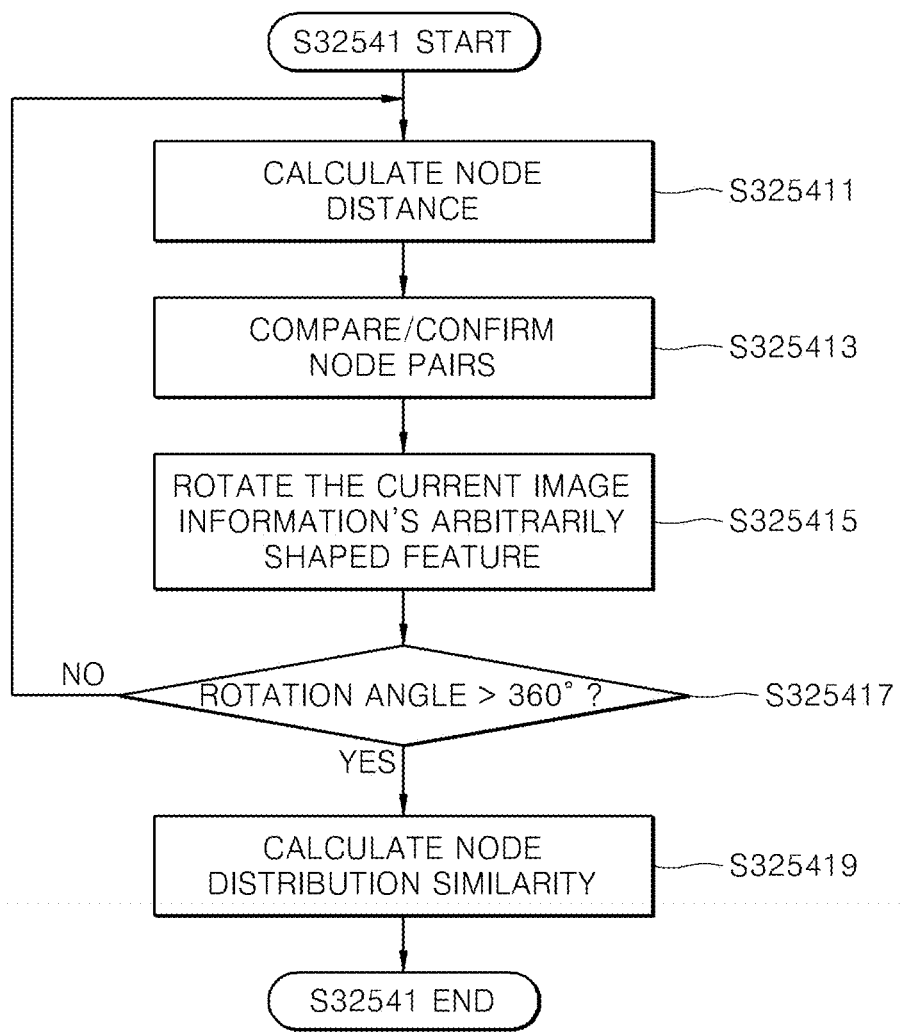
FIG. 40 is a flowchart illustrating an update step of selecting an observation model according to whether or not an arbitrarily shaped ceiling feature has orientation information.

First, the node distribution similarity calculation step S32541 calculates a similarity between node distributions of targets intersected in the arbitrarily shaped feature in the current image information and the region of uncertainty of the arbitrarily shaped feature in the predicted image. The node distribution similarity between all the regions of interest included in the current image information is calculated. FIG. 40 shows a detailed flowchart of the node distribution similarity calculation step S32541. The node distribution similarity calculation step S32541 includes a node distance calculation step S325411, a node pair comparison and confirmation step S325413, a current image information's arbitrarily shaped feature rotation step S325415, and a node distribution similarity calculation step S325419.

The control unit 300 performs the node distance calculation step S325411 where the node distance is calculated using the polar coordinate information between nodes. Thereafter, the control unit 300 performs the node pair comparison and confirmation step S325415 where the node distance is compared with the similar range distance $d_{sim}$ preset and stored in the storage unit 400 to confirm the number N of node pairs in which the node distance d is smaller than the similar range distance $d_{sim}$ and store the coordinate information of the node pair.

Thereafter, the control unit 300 performs the current image information's arbitrarily shaped feature rotation step S325415 where the arbitrarily shaped feature as a comparison target in the current image information is rotated by a preset angle about the center point $P_{mean}$ of the arbitrarily shaped feature as a comparison target in the current image information. In step S325415, the control unit 300 controls the center point $P_{mean}$ of the arbitrarily shaped feature in the current image information to be rotated by a preset angle (although the preset angle has been set to 1°, it is not limited thereto). Then, the control unit 300 performs the current image information's arbitrarily shaped feature rotation completion determination step S325417 of determining whether or not the rotation angle reaches 360°. If it is determined in step S325417 that the rotation angle does not reach 360°, the control flow returns to the node distance calculation step S325411 where the control unit 300 repeatedly performs the process of confirming the node distance and the node pair between the rotated target region of interest and the other comparison regions of interest. On the other hand, if it is determined in step S325417 that the rotation angle reaches 360°, the control flow returns to step S325419 where the control unit 300 calculates a node distribution between the arbitrarily shaped feature in the current image information and the arbitrarily shaped feature in the predicted image. The calculation of the node distribution is the same as that in the previous step S25119. In addition, the calculation of similarity of size and orientation robustness is the same as the similarity calculation method as described above except that a comparison is made between an arbitrarily shaped feature in the current image information and an arbitrarily shaped feature in the predicted image, which intersects the arbitrarily shaped feature in the current image information. The calculation equation of a final similarity $S_f$ including the node distribution similarity, and the similarity of the size and orientation robustness is the same as the above-mentioned calculation equation, and thus a detailed description thereof will be omitted to avoid redundancy.

Subsequently, the control unit 300 performs the feature similarity comparison step S3255 where a similarity $S_f$ between the arbitrarily shaped feature in the current image information and the arbitrarily shaped feature in the predicted image is compared with a predicted feature similarity $S_{th}$ preset and stored in the storage unit 400. As a result of the comparison in step S3255, if it is determined that the similarity $S_f$ is smaller than or equal to the predicted feature similarity $S_{th}$, the control unit 300 determines that there is no match between the arbitrarily shaped feature in the current image information and the arbitrarily shaped feature in the predicted image, and then performs a no-match confirmation to create match information on whether or not there is a match therebetween in the feature similarity confirmation step S3257. By virtue of this process, the control unit 300 determines that the arbitrarily shaped feature in the current image information is a new feature that is not stored in the feature map, and stores the arbitrarily shaped feature in the current image information as the new feature in the storage unit 400.

On the other hand, if it is determined in step S3255 that the similarity $S_f$ is greater than the predicted feature similarity $S_{th}$, the control unit 300 determines that there is a match between the arbitrarily shaped feature in the current image information and the arbitrarily shaped feature in the predicted image, and then performs a match confirmation to create match information on whether or not there is a match therebetween in the feature similarity confirmation step S3256.

This process is performed on all the targets intersected in the arbitrarily shaped feature in the current image information and the region of uncertainty of the arbitrarily shaped feature in the predicted image.

In the meantime, if it is confirmed in step S3253 that there is no match and the control flow proceeds to step S40, the control unit 300 performs the position restoration step S40. The position restoration step S40 includes a position restoration feature matching step S47, a mobile robot device orientation confirmation step S48, and a priority candidate position selection step S49. In the position restoration feature matching step S47, the control unit 300 compares all the descriptors between an arbitrarily shaped feature in current mage information and features stored in the storage unit 40 and confirms whether or not there is another matched feature stored in the storage unit, and assigns a candidate position of the mobile robot device to the circumference of the other matched feature. In other words, the position restoration step is performed in the case where there is a failure in localization of the mobile robot device due to unexpected exertion of an external force or sliding. Such the position restoration is a technique in which a feature observed from the image information is compared with the feature map to find the optimum position in order to identify the current position of the mobile robot device based on a pre-recorded feature map. In the position restoration step, the control unit 300 compares the arbitrarily shaped feature in the current image information with all the features stored in the storage unit 40 to confirm whether or not there is a match between the features compared. Whether or not there is a match between the features compared is determined by comparing the descriptors, calculating similarity, and comparing the calculated similarity with a similarity reference value (the predicted feature similarity as described above may be used) for the pre-stored similarity.

Figure 48:
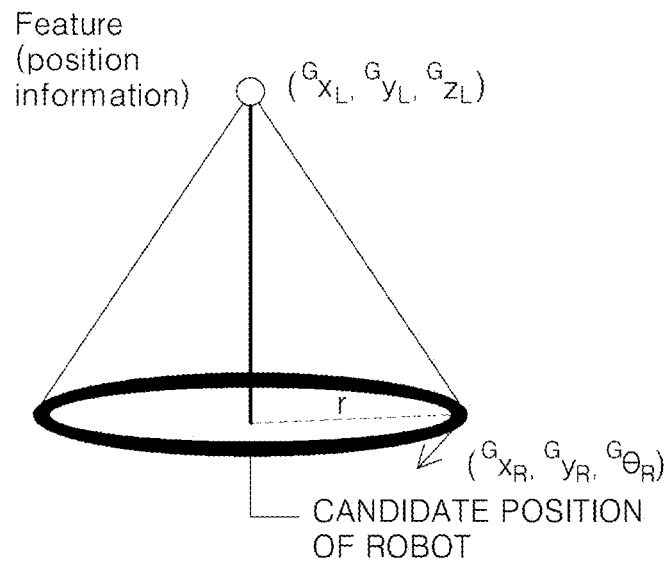
FIGS. 48 to 50 are state diagrams showing candidate positions of a mobile robot device in a position restoration step.
Figure 49:
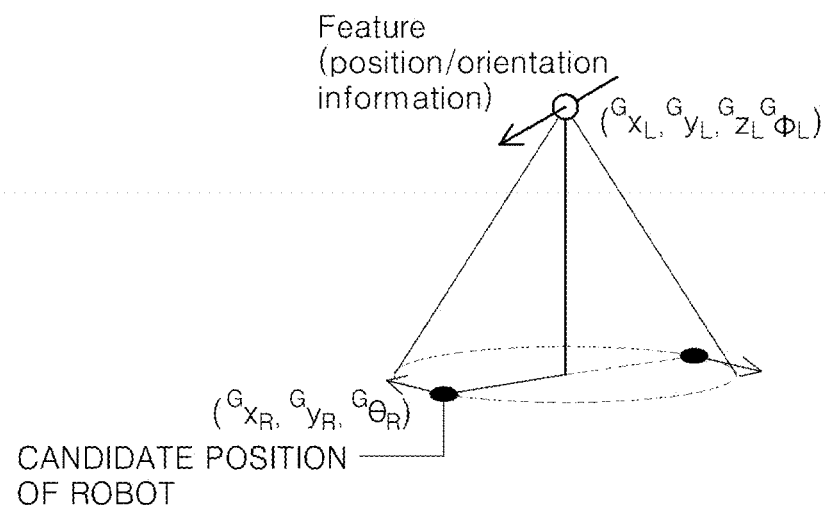

If a matched feature is derived, the control unit 300 can select a candidate position of the mobile robot device 10 as shown in FIGS. 48 and 49 based on position information of the matched feature in the feature map. FIG. 48 shows the case where the matched feature has only position information wherein a circular shaped position is selected as the candidate position of the mobile robot device. On the other hand, FIG. 49 shows the case where the matched feature has orientation information along with the position information wherein the candidate position of the mobile robot device is reduced to two points that are antipodal to each other.

Figure 44:
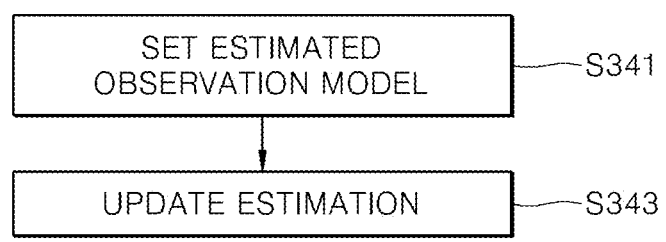
FIG. 44 is a flowchart schematically illustrating an estimation step.

Then, the control unit 300 performs the mobile robot device orientation confirmation step S48 where orientation of the mobile robot device can be calculated by the following equation:

$$^G\theta_R = \tan^{-1}(^Gx_L - ^Gx_R, ^Gy_L - ^Gy_R) - ^I\phi_L$$

wherein $(^Gx_L, ^Gy_L)$ denote two-dimensional coordinates of a feature on the global coordinate system, $(^Gx_R, ^Gy_R, ^G\theta_R)$ denote position/orientation of the mobile robot device of the candidate position, and $^I\phi_L$ denotes an angle to a feature relative to a V axis on the image coordinate system in the image information (see FIG. 44).

Figure 50:
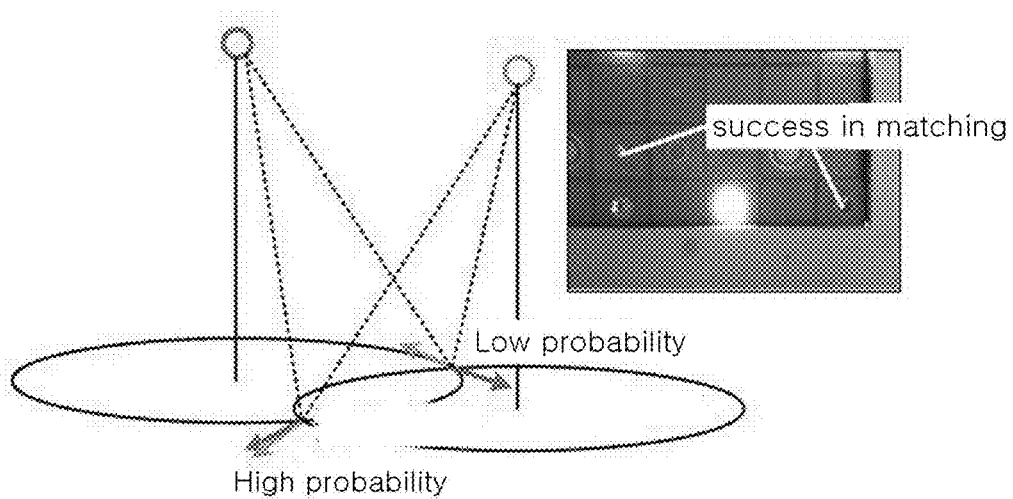
Figure 51:
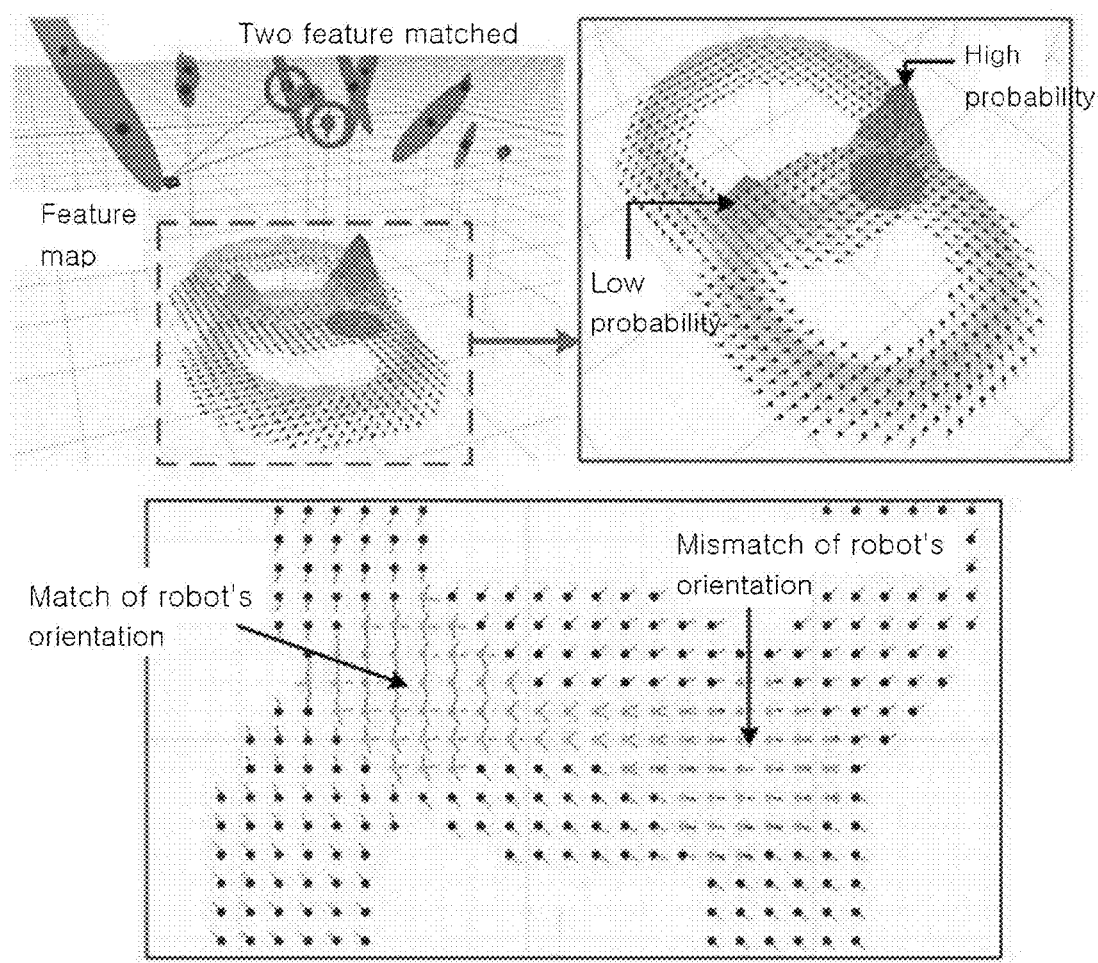
FIG. 51 is a diagram showing whether or not the orientation of a candidate position is matched when the orientation of the mobile robot device is considered with respect to the candidate position of the mobile robot device in the position restoration step.

As such, the control unit 300 can perform the priority candidate position selection step S49 where when the candidate positions for the position of the mobile robot device 10 for the matched feature intersect each other, a high probability is primarily assigned to the intersected points of the candidate positions. In this case, when there is a match between the robot's orientation and orientations of the intersected points, a higher probability is assigned to an intersected point having an orientation which matches the robot's orientation as shown in FIGS. 50 and 51, so that a priority is assigned to the candidate position to select the priority candidate position based on the position information and the orientation information.

Then, the control unit 300 performs the estimation step S34. In this embodiment, the estimation step S34 may take a configuration in which an observation model varies depending on whether or not a feature has an orientation to achieve more accurate and rapid estimation. That is, the estimation step S34 includes an estimation observation model setting step S341 and an estimation update step S343. In the estimation observation model setting step S341, an observation model is set depending on whether or not a feature has an orientation, and correction is performed using the set observation model in the estimation update step S343.

The control unit 300 performs the estimation observation model setting step S341. In the estimation observation model setting step S341, the control unit 300 can use the orientation information as the stored descriptor when a corresponding region of interest is used as an arbitrarily shaped feature using a result of comparison in the preset principal axis length comparison step S2353 in the step of confirming an orientation as a descriptor. The control unit 300 may update predicted values such as a predicted position of the mobile robot device 300, and a predicted position and a predicted image of the arbitrarily shaped feature in the predicted position by selecting an observation model according to a result of comparison in the preset principal axis length comparison step. Here, the update of the predicted values is performed to update a predicted state vector to form an estimated vector at the current time. The predicted values may include a predicted position of the mobile robot device, and a predicted position and a predicted image of the arbitrarily shaped feature. More specifically, the predicted position derived from the estimated position at the previous stage is updated due to the moving distance of the mobile robot device, and the predicted position of an arbitrarily shaped feature can be regarded as a fixed point on the global coordinate system, and thus the estimated position of the arbitrarily shaped feature at the previous stage (time t−1) can be used as the predicted position of the arbitrarily shaped feature at the current stage (time t). The predicted position of the arbitrarily shaped feature viewed from the mobile robot device, i.e., the predicted position of the arbitrarily shaped feature at the updated predicted position of the mobile robot device, and the predicted image associated therewith can be corrected due to the update of the predicted position of the mobile robot device.

Figure 45:
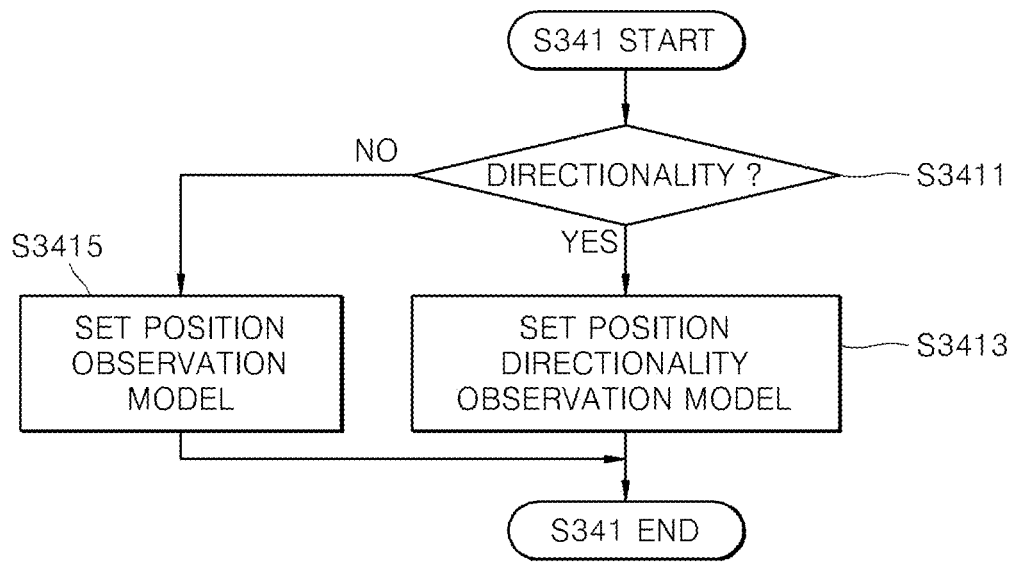
FIG. 45 is a flowchart illustrating an observation model setting step of the estimation step of selecting an observation model according to whether or not an arbitrarily shaped ceiling feature has orientation information.

In other words, the estimation observation model setting step S341 may include a directionality confirmation step S3411, a position/directionality observation model setting step S3413, and a position observation model setting step S3415 as shown in FIGS. 44 and 45, if necessary. The position/directionality observation model setting step S3413 and the position observation model setting step S3415 are alternatively selected depending on a result of confirmation in the directionality confirmation step S3411.

In the directionality confirmation step S3411, the control unit 300 confirms whether or not an arbitrarily shaped feature has an orientation depending on a result of comparison in the preset principal axis length comparison step S2353. That is, as a result of comparison in step S2353, if it is determined in step S2353 that an arbitrarily shaped feature has a directionality based on a set value for a set arbitrarily shaped feature (region of interest before confirmation of a feature), the control unit 300 perform the position/directionality observation model setting step S3413 where a position/directionality observation model $h_L$ for the position and directionality of the arbitrarily shaped feature is set. On the other hand, if it is determined in step S2353 that the arbitrarily shaped feature has a directionality, the control unit 300 performs the position observation model $h_L$ setting step S3415 where a position observation model $h_{L1}$ for the position of the arbitrarily shaped feature is set.

The position/directionality observation model $h_L$ is an observation model presenting the position and orientation of the arbitrarily shaped feature predicted on the coordinate system of the mobile robot device 10 using arbitrarily shaped ceiling features based on the state vector predicted at the current stage (time t), and the position/directionality observation model $h_L$ is expressed as follows:

$$h_L = \begin{bmatrix} {}^I r_L \\ {}^I \theta_L \\ {}^I \phi_L \end{bmatrix} = \begin{bmatrix} \sqrt{(x_{RL}^2) + (y_{RL})^2} \times \frac{f_{cam}}{G_{z_L}} \\ \tan^{-1}\left(\frac{y_{RL}}{x_{RL}}\right) - {}^G\theta_R \\ {}^G\phi_R - {}^G\theta_R \end{bmatrix}$$

$$x_{RL} = {}^G x_L - {}^G x_R - x_{off} \cos {}^G\theta_R$$
$$y_{RL} = {}^G y_L - {}^G y_R - x_{off} \sin {}^G\theta_R$$

wherein $f_{cam}$ denotes a focal distance of the image input unit 110, $x_{off}$ denotes a position offset of the image input unit 100 from the rotation center of the mobile robot device 10 using arbitrarily shaped ceiling features to the front of from the rotation center of the mobile robot device 10 using arbitrarily shaped ceiling features, and $[{}^I r_L, {}^I \theta_L, {}^I \phi_L]$ denotes a position (or position and orientation) of an arbitrarily shaped feature in the image information obtained from the image input unit 110.

Figure 46:
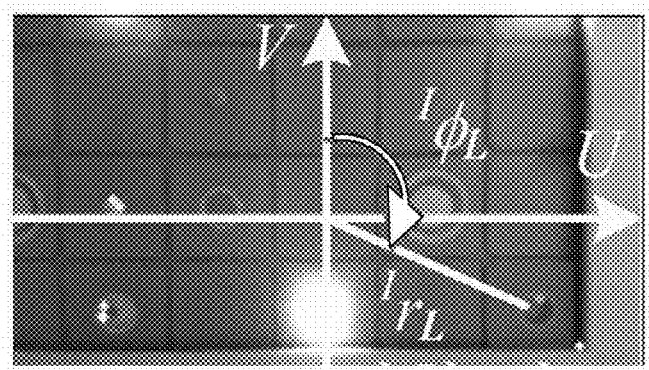
FIGS. 46 and 47 are state diagrams showing a coordinate relationship of an observation model of features including an arbitrarily shaped ceiling feature in a coordinate system in image information of an image input unit of a mobile robot device.
Figure 47:
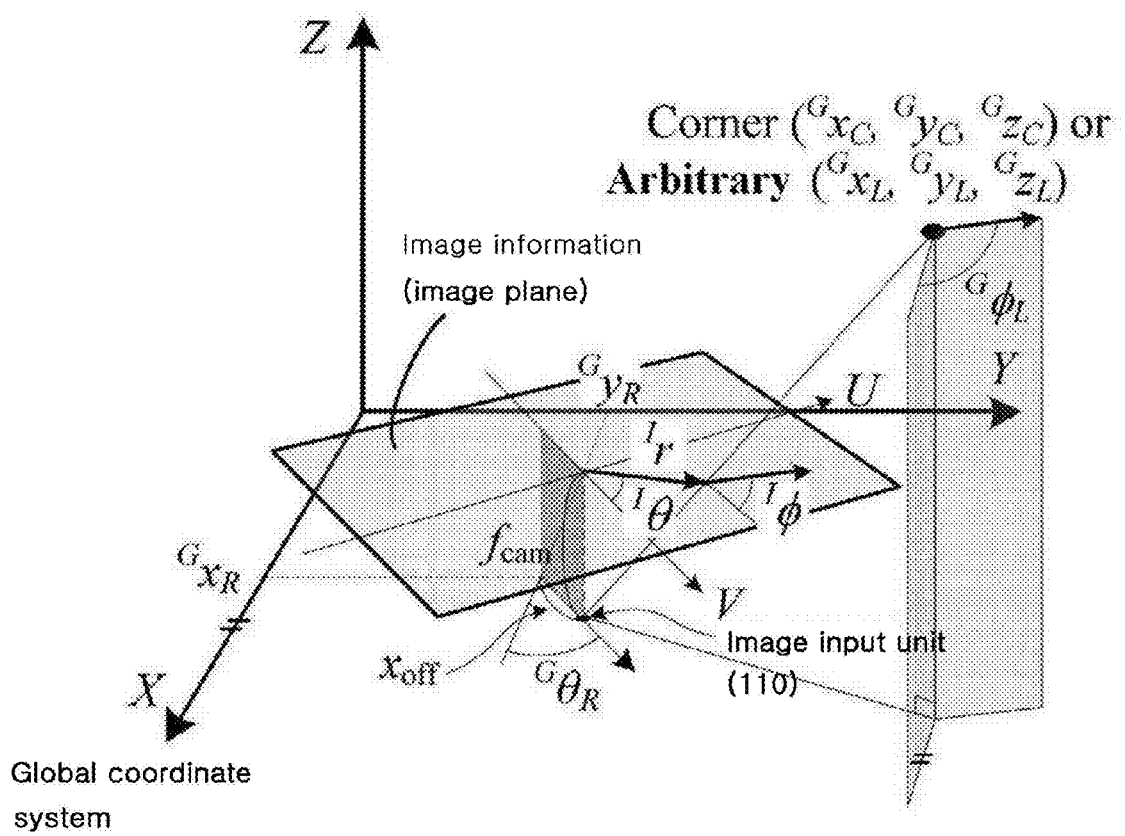

FIGS. 46 and 48 show a relationship in which an arbitrarily shaped feature in the image information acquired by the image input unit 110 is expressed on the coordinate system U-V of the mobile robot device 10 using arbitrarily shaped ceiling features, and a state diagram illustrating a relationship for the arbitrarily shaped feature (or corner feature) on the global coordinate system X-Y-Z.

An observed value $\hat{Z}_t = h(\hat{X}_t^-)$ representing the position (position and orientation) of the feature including the arbitrarily shaped feature predicted on the coordinate system U-V of the mobile robot device 10 using arbitrarily shaped ceiling features or the image input unit 110 of the mobile robot device 10 using arbitrarily shaped ceiling features can be derived based on the state vector predicted in at the current stage (time t), using the predicted state vector $\hat{X}_t^-$ that can derive the above position/directionality observation model $h_L$, the predicted position of the mobile robot device at time t (i.e., the current stage) obtained in the prediction step, and the predicted image of the arbitrarily shaped feature at the predicted position.

On the other hand, if it is determined in step S2353 that the arbitrarily shaped feature does not have a directionality and thus a set value indicating no directionality of the arbitrarily shaped feature is used, the control flow proceeds from step S321 to step S325 where the control unit 300 performs the step S325 where an observed value $\hat{Z}_y = h(\hat{X}_t^-)$ representing the position (position) of the feature including the arbitrarily shaped feature predicted on the coordinate system U-V of the mobile robot device 10 using arbitrarily shaped ceiling features or the image input unit 110 of the mobile robot device 10 using arbitrarily shaped ceiling features can be derived based on the state vector predicted in at the current stage (time t), using the predicted state vector $\hat{X}_t^-$ that can derive the above position observation model $h_{L1}$, the predicted position of the mobile robot device at time t (i.e., the current stage) obtained in the prediction step, and the predicted image of the arbitrarily shaped feature having no directionality at the predicted position.

Here, the position observation model $h_{L1}$ used has a structure in which a variable presenting orientation is removed from the position/directionality observation model $h_L$. In this case, the state vector for the arbitrarily shaped feature has a structure of $X_L = [{}^G x_L, {}^G y_L, {}^G z_L]$.

$$h_{L1} = \begin{bmatrix} {}^I r_L \\ {}^I \theta_L \end{bmatrix} = \begin{bmatrix} \sqrt{(x_{RL}^2) + (y_{RL})^2} \times \frac{f_{cam}}{G_{z_L}} \\ \tan^{-1}\left(\frac{y_{RL}}{x_{RL}}\right) - {}^G\theta_R \end{bmatrix}$$

$$x_{RL} = {}^G x_L - {}^G x_R - x_{off} \cos {}^G\theta_R$$
$$y_{RL} = {}^G y_L - {}^G y_R - x_{off} \sin {}^G\theta_R$$

Although it has not been described herein, if a corner feature is included in the feature besides the arbitrarily shaped feature, the observation model of the corner feature is nearly the same as that of the arbitrarily shaped feature having no directionality.

Thereafter, the control unit 300 performs the estimation update step S343 where the predicted value is updated using the observation model set in the estimation observation model setting step S341. In the feature matching step S32, if it is determined that there is no match (S3257), the control unit 300 creates feature information in which the arbitrarily shaped feature is regarded as a new feature and regards arbitrarily shaped feature as the new feature without updating the predicted vector including a predicted position of a separate mobile robot device 10 using arbitrarily shaped ceiling features to add the new feature to the covariance matrix and the state vector including the position of the mobile robot device and the position (position and orientation) of the arbitrarily shaped feature in the estimation step S34.

On the other hand, if match information indicating a match is created in the feature matching step S32 (S3256), the control unit 300 corrects the predicted position of the mobile robot device 10 using arbitrarily shaped ceiling features and the predicted values (predicted position and/or orientation, and predicted image of the arbitrarily shaped feature) for the arbitrarily shaped feature at the predicted position using the arbitrarily shaped feature in the estimation update step S343 of the estimation step S34. That is, the control unit 300 determines that the prediction considering the position and directionality of the arbitrarily shaped feature is performed accurately, and corrects the predicted position of the mobile robot device 10 using arbitrarily shaped ceiling features and the predicted image of the arbitrarily shaped feature at the predicted position. More specifically, the control unit 300 performs the following process of correcting the state vector and the covariance matrix using Kalman gain in the estimation step S34:

$$K_t = P_t^- H_t^T (H_t P_t^- H_t^T + R_t)^{-1}$$

$$\hat{X}_t = \hat{X}_t^- + K_t (Z_t - \hat{Z}_t)$$

$$P_t = (I - K_t H_t) P_t^-$$

An estimated vector including the estimated position of the mobile robot device 10 at the corrected current stage (time t) and the estimated position of the arbitrarily shaped feature can be derived by using a difference in an observed value $\hat{Z}_t = h(\hat{X}_t^-)$ representing the position (position and orientation) of the feature including the arbitrarily shaped feature predicted on the coordinate system U-V of the mobile robot device 10 using arbitrarily shaped ceiling features or the image input unit 100 of the mobile robot device 10 using arbitrarily shaped ceiling features based on an actual measurement value $Z_t$ including the position of an arbitrarily shaped feature obtained from the image information at the current stage (time t), and a state vector predicted at the current stage (time t). The estimated vector can be used as an estimated value in the localization step at the next time.

The above-mentioned embodiments are examples to described the present invention, and the present invention is not limited thereto. Various modifications can be made within a range of assigning a descriptor of the arbitrarily shaped feature to the region of interest and employing a accurate and excellent localization method.

While the present invention has been described in connection with the exemplary embodiments illustrated in the drawings, they are merely illustrative embodiments, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should be defined by the technical spirit of the appended claims.

INDUSTRIAL APPLICABILITY

The mobile robot localization method using arbitrarily shaped ceiling features of the present invention can be applied to various kinds of mobile robots that operate in indoor environments, such as household robots, industrial robots, and the like.

What is claimed is:

1. A method for localizing a mobile robot using arbitrarily shaped (AS) ceiling features, comprising:
   a device providing step of providing a mobile robot device which is localized using the arbitrarily shaped ceiling features and includes an image input unit, an encoder sensing unit, an arithmetic unit, a control unit, a storage unit, and a driving unit;
   a feature extraction step of extracting features which include an arbitrarily shaped feature from a contour extracted from image information inputted through the image input unit; and
   a localization step of localizing the mobile robot device using the extracted features,
   wherein a descriptor indicating the characteristics of the arbitrarily shaped feature is assigned in the feature extraction step,
   wherein the feature extraction step comprises:
   a region-of-interest (ROI) extraction step of detecting and labeling the contour from the image information, and extracting a region of interest (ROI);
   an ROI descriptor creation step of assigning a descriptor indicating the characteristics of the region of interest to the region of interest; and
   an ROI robustness confirmation step of confirming whether or not the region of interest is set as a feature used in the localization step based on the descriptor of the region of interest and a preset reference stored in the storage unit,
   wherein the ROI robustness confirmation step comprises:
   an ROI similarity calculation step of calculating a similarity defining a resemblance between regions of interest in the current image;
   an ROI uniqueness calculation step of calculating a region-of-interest (ROI) uniqueness by assigning a weighting factor to a similarity between other regions of interest adjacent to the region of interest in the current image;
   a uniqueness determination step of comparing the calculated ROI uniqueness with a preset uniqueness stored in the storage unit, and determining whether or not the calculated ROI uniqueness has stability as a feature; and
   an ROI robustness determination step of confirming whether or not the ROI uniqueness is used as a feature of the region of interest depending on a result of determination in the uniqueness determination step.

2. The method according to claim 1, wherein the region-of-interest extraction (ROI) step comprises:
   an image binary coding step of binary-coding the image information;
   a contour detection step of detecting the contour from the binary-coded image information;
   a labeling step of grouping regions connected by the contour detected in the contour detection step; and
   an ROI setting step of setting the regions grouped in the labeling step as a region of interest.

3. The method according to claim 2, wherein the labeling step uses a dilation operation, and a circular window having a predetermined radius is used in the dilation operation.

4. The method according to claim 1, wherein the ROI descriptor creation step comprises:
   an ROI node distribution confirmation step of setting the outer corners of the region of interest as nodes of the region of interest, and confirming coordinates of the nodes of the region of interest from the outer corners of the region of interest;
   an ROI size confirmation step of confirming a size of the region of interest; and
   an ROI orientation confirmation step of confirming an orientation of region of interest.

5. The method according to claim 4, wherein the coordinates of the nodes of the region of interest is polar coordinates.

6. The method according to claim 4, wherein the coordinates of the nodes of the region of interest are Cartesian coordinates.

7. The method according to claim 1, wherein the ROI similarity calculation step comprises:
   an ROI confirmation step of confirming the regions of interest in the current image;
   an ROI setting step of setting a target region of interest and a comparison region of interest from the confirmed regions of interest;
   a node distribution similarity calculation step of calculating a similarity in node distribution between the target region of interest and the comparison region of interest;
   a size similarity calculation step of calculating a similarity in size between the target region of interest and the comparison region of interest;
   an orientation similarity calculation step of calculating a similarity in orientation between the target region of interest and the comparison region of interest;

an ROI similarity calculation step of finally calculating a region-of-interest (ROI) similarity S from the node distribution similarity, the size similarity, and the orientation similarity;

a remaining comparison ROI determination step of determining whether or not there exists a remaining comparison region of interest which is not compared with the target region of interest among the regions of interest in the current image; and a remaining ROI determination step of determining whether or not there exists a remaining region of interest which is not set as the target region of interest among the regions of interest in the current image if it is determined in the remaining comparison ROI determination step that there does not exist the remaining comparison region of interest.

8. The method according to claim 7, wherein the node distribution similarity calculation step comprises:

a node distance calculation step of calculating a distance between the nodes the target region of interest and the comparison region of interest;

a node pair comparison and confirmation step of comparing the node distance with a preset similar range distance stored in the storage unit 400, confirming the number N of node pairs having the node distance d smaller than the similar range distance, and storing coordinate information of the node pairs;

a target ROI rotation step of rotating the target region of interest about a center point of the target region of interest by a preset angle;

a target ROI rotation completion determination step of confirming whether or not the rotation angle of the target region of interest reaches 360°;

a node distribution similarity operation step of operating the similarity in node distribution between the target region of interest and the comparison region of interest using the minimum node distance and the number of node pairs if it is determined that the rotation angle of the target region of interest reaches 360° in the ROI rotation completion determination step.

9. The method according to claim 1, wherein the localization step comprises:

a prediction step of creating a predicted position of the mobile robot device at a current stage and a predicted image of an arbitrarily shaped feature at the predicted position, based on an estimated position of the mobile robot device using arbitrarily shaped ceiling features and an estimated image of the arbitrarily shaped ceiling feature at a previous stage, which are calculated based on image information obtained from the image input unit, and a signal of the encoder sensing unit;

a feature matching step of confirming whether or not there is a match between the arbitrarily shaped feature extracted in the feature extraction step and the arbitrarily shaped feature in the predicted image, and creating match information; and an estimation step of correcting the predicted position of the mobile robot device and a predicted value of the arbitrarily shaped feature depending on the match information created in the feature matching step.

10. The method according to claim 9, wherein if it is determined that the arbitrarily shaped feature in the predicted image in the feature matching step does not match the arbitrarily shaped feature extracted from the image information obtained from the image input unit, the arbitrarily shaped feature in the image information obtained from the image input unit is set and stored as a new feature.

11. The method according to claim 9, wherein the feature matching step comprises:

a predicted image feature extraction step of extracting the arbitrarily shaped feature in the predicted image;

a predicted image feature descriptor creation step of assigning a descriptor indicating the characteristics of the arbitrarily shaped feature to the arbitrarily shaped feature in the predicted image; and a predicted image feature matching step of comparing the arbitrarily shaped feature in the image information, which is extracted in the feature extraction step with the arbitrarily shaped feature in the predicted image.

12. A method for localizing a mobile robot using arbitrarily shaped (AS) ceiling features, comprising:

a device providing step of providing a mobile robot device which is localized using the arbitrarily shaped ceiling features and includes an image input unit, an encoder sensing unit, an arithmetic unit, a control unit, a storage unit, and a driving unit;

a feature extraction step of extracting features which include an arbitrarily shaped feature from a contour extracted from image information inputted through the image input unit; and a localization step of localizing the mobile robot device using the extracted features, wherein a descriptor indicating the characteristics of the arbitrarily shaped feature is assigned in the feature extraction step, wherein the localization step comprises:

a prediction step of creating a predicted position of the mobile robot device at a current stage and a predicted image of an arbitrarily shaped feature at the predicted position, based on an estimated position of the mobile robot device using arbitrarily shaped ceiling features and an estimated image of the arbitrarily shaped ceiling feature at a previous stage, which are calculated based on image information obtained from the image input unit, and a signal of the encoder sensing unit;

a feature matching step of confirming whether or not there is a match between the arbitrarily shaped feature extracted in the feature extraction step and the arbitrarily shaped feature in the predicted image, and creating match information; and an estimation step of correcting the predicted position of the mobile robot device and a predicted value of the arbitrarily shaped feature depending on the match information created in the feature matching step, wherein the feature matching step comprises:

a predicted image feature extraction step of extracting the arbitrarily shaped feature in the predicted image;

a predicted image feature descriptor creation step of assigning a descriptor indicating the characteristics of the arbitrarily shaped feature to the arbitrarily shaped feature in the predicted image; and a predicted image feature matching step of comparing the arbitrarily shaped feature in the image information, which is extracted in the feature extraction step with the arbitrarily shaped feature in the predicted image, wherein the predicted image feature matching step comprises:

a predicted intersection number confirmation step of confirming whether or not a predicted number of intersections in which the extracted arbitrarily shaped feature in the image information intersects a region of uncertainty of the arbitrarily shaped feature in the predicted image;

a predicted intersection number determination step of determining whether or not the predicted number of intersections in the predicted intersection number confirmation step is 1;

a predicted feature similarity calculation step of calculating a similarity in predicted feature defining a resemblance between the arbitrarily shaped feature in the image information and the arbitrarily shaped feature in the predicted image if it is determined that the predicted number of intersections in the predicted intersection number confirmation step is 1;

a feature similarity comparison step of comparing the similarity in predicted feature with a preset similarity in feature stored in the storage unit; and a feature similarity confirmation step of confirming whether or not there is a match between the arbitrarily shaped feature in the image information and the arbitrarily shaped feature in the predicted image depending on a result of comparison in the feature similarity comparison step.

13. The method according to claim 12, wherein if it is determined in the predicted intersection number determination step that the predicted number of intersections is zero, the control flow proceeds to a position restoration step, wherein the position restoration step comprises:

a position restoration feature matching step of comparing all the descriptors between an arbitrarily shaped feature in current image information and features stored in the storage unit, confirming whether or not there is another matched feature stored in the storage unit, and assigning a candidate position of the mobile robot device to the circumference of the other matched feature a mobile robot device orientation confirmation step of confirming an orientation of the mobile robot device using two-dimensional coordinates of the other matched feature on a global coordinate system, the position of the mobile robot device on the candidate position, and an angle formed between a reference coordinate axis in the image information and the other matched feature; and a priority candidate position selection step of assigning a priority to the candidate position based on the position information and orientation information on the other matched feature, and the orientation information of the mobile robot device.

* * * * *